US012063990B2

(12) United States Patent
Mun et al.

(10) Patent No.: US 12,063,990 B2
(45) Date of Patent: Aug. 20, 2024

(54) MASK APPARATUS

(71) Applicant: LG Electronics Inc., Seoul (KR)

(72) Inventors: Yeongcheol Mun, Seoul (KR); Taeun Heo, Seoul (KR); Wansu Youn, Seoul (KR); Sangkyun Baek, Seoul (KR); Chiyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 919 days.

(21) Appl. No.: 17/121,115

(22) Filed: Dec. 14, 2020

(65) Prior Publication Data

US 2021/0378325 A1 Dec. 9, 2021

(30) Foreign Application Priority Data

Jun. 5, 2020 (KR) ........................ 10-2020-0068413

(51) Int. Cl.
*A41D 13/11* (2006.01)
*A62B 18/02* (2006.01)

(52) U.S. Cl.
CPC ...... *A41D 13/1146* (2013.01); *A41D 13/1161* (2013.01); *A62B 18/025* (2013.01)

(58) Field of Classification Search
CPC ............................ A41D 13/11; A41D 13/1176
See application file for complete search history.

(56) References Cited

U.S. PATENT DOCUMENTS 4,546,793 A 10/1985 Stupecky
4,646,732 A * 3/1987 Chien .................. A62B 18/025 128/205.12
5,062,421 A 11/1991 Burns et al.
5,372,130 A * 12/1994 Stern .................... A62B 18/006 128/206.17
5,782,234 A 7/1998 Bates
6,213,119 B1 4/2001 Brydon et al.
(Continued)

FOREIGN PATENT DOCUMENTS

CN 1455270 11/2003
CN 103505788 1/2014
(Continued)

OTHER PUBLICATIONS

Office Action in Taiwanese Appln. No. 11120021940, dated Dec. 20, 2020, 11 pages (with English translation).
(Continued)

*Primary Examiner* — Joseph D. Boecker
*Assistant Examiner* — Thomas W Greig
(74) *Attorney, Agent, or Firm* — Fish & Richardson P.C.

(57) ABSTRACT

A mask apparatus includes a mask body including an air duct disposed at a front surface of the mask body, and a fan module mounting portion disposed at a suction-side of the air duct, a fan module disposed at the fan module mounting portion and configured to supply external air to the air duct, a mask body cover that is coupled to the front surface of the mask body and covers the fan module and the air duct, a seal coupled to a rear surface of the mask body and configured to contact a user's face and define a breathing space for the user, a sealing bracket that fixes a portion of the seal to the rear surface of the mask body, and a pad configured to be disposed inside the breathing space.

20 Claims, 11 Drawing Sheets

(56) References Cited

U.S. PATENT DOCUMENTS

| | | | | |
|---|---|---|---|---|
| 6,543,450 | B1 | 4/2003 | Flynn | |
| 8,667,959 | B2 | 3/2014 | Tilley et al. | |
| 10,226,542 | B2 | 3/2019 | Messina et al. | |
| 10,342,999 | B2 | 7/2019 | Song et al. | |
| 10,661,104 | B2 | 5/2020 | Morgan et al. | |
| 11,241,594 | B2 * | 2/2022 | Szasz | A62B 18/10 |
| 2003/0052279 | A1 | 3/2003 | Kikuchi | |
| 2003/0066257 | A1 | 4/2003 | Shovlin | |
| 2003/0066527 | A1 | 4/2003 | Chen | |
| 2005/0145249 | A1 | 7/2005 | Solyntjes et al. | |
| 2006/0076012 | A1 * | 4/2006 | Tanizawa | A62B 18/006 128/206.16 |
| 2007/0125385 | A1 | 6/2007 | Ho et al. | |
| 2009/0320847 | A1 | 12/2009 | Bozanic et al. | |
| 2010/0101575 | A1 | 4/2010 | Fedorko et al. | |
| 2010/0224190 | A1 | 9/2010 | Tilley et al. | |
| 2010/0313892 | A1 * | 12/2010 | Shigematsu | A61M 16/105 128/207.12 |
| 2010/0329924 | A1 | 12/2010 | Harris | |
| 2011/0126713 | A1 | 6/2011 | Legare et al. | |
| 2014/0216475 | A1 * | 8/2014 | Blomberg | A62B 9/04 128/863 |
| 2014/0360501 | A1 | 12/2014 | Guiducci et al. | |
| 2015/0034080 | A1 | 2/2015 | Furuichi et al. | |
| 2015/0047642 | A1 | 2/2015 | Tucker et al. | |
| 2015/0136142 | A1 | 5/2015 | Blomberg | |
| 2015/0151143 | A1 | 6/2015 | Langford | |
| 2015/0202473 | A1 | 7/2015 | Curran et al. | |
| 2015/0217144 | A1 | 8/2015 | Skov et al. | |
| 2015/0217146 | A1 | 8/2015 | Skov et al. | |
| 2015/0250915 | A1 | 9/2015 | Pugh et al. | |
| 2015/0289598 | A1 | 10/2015 | Hsiung | |
| 2015/0306324 | A1 | 10/2015 | Ayon et al. | |
| 2015/0362478 | A1 | 12/2015 | Phillips | |
| 2016/0001111 | A1 | 1/2016 | Morgan et al. | |
| 2016/0022944 | A1 | 1/2016 | Chodkowski et al. | |
| 2016/0030778 | A1 | 2/2016 | Skov et al. | |
| 2016/0030779 | A1 | 2/2016 | Twu et al. | |
| 2016/0074604 | A1 | 3/2016 | Bronner et al. | |
| 2016/0236016 | A1 | 8/2016 | Ono et al. | |
| 2016/0279450 | A1 | 9/2016 | Goldstein et al. | |
| 2017/0136271 | A1 | 5/2017 | Munster | |
| 2017/0157353 | A1 | 6/2017 | Olsen et al. | |
| 2018/0078798 | A1 | 3/2018 | Fabian et al. | |
| 2018/0177965 | A1 | 6/2018 | Patel | |
| 2018/0185677 | A1 | 7/2018 | Curran et al. | |
| 2018/0236275 | A1 * | 8/2018 | Song | A62B 18/10 |
| 2018/0318457 | A1 | 11/2018 | Lucio | |
| 2019/0009114 | A1 * | 1/2019 | Han | A41D 1/002 |
| 2019/0113501 | A1 | 4/2019 | Jameson et al. | |
| 2019/0160249 | A1 | 5/2019 | Rose et al. | |
| 2019/0175962 | A1 | 6/2019 | Su et al. | |
| 2019/0275357 | A1 | 9/2019 | Palmer, Jr. et al. | |
| 2020/0008539 | A1 | 1/2020 | Kolasa | |
| 2020/0038614 | A1 | 2/2020 | Duff et al. | |
| 2020/0086071 | A1 | 3/2020 | Lin et al. | |
| 2020/0087031 | A1 | 3/2020 | Yoo et al. | |
| 2020/0129650 | A1 | 4/2020 | Kim et al. | |
| 2020/0155877 | A1 | 5/2020 | Key et al. | |
| 2021/0228920 | A1 | 7/2021 | Arigue et al. | |
| 2021/0337891 | A1 * | 11/2021 | Shah | A62B 23/025 |
| 2021/0379412 | A1 | 12/2021 | Lee et al. | |
| 2021/0379418 | A1 | 12/2021 | Kim et al. | |
| 2021/0402222 | A1 | 12/2021 | Kwon et al. | |
| 2022/0016449 | A1 | 1/2022 | Choi et al. | |

FOREIGN PATENT DOCUMENTS

| | | | |
|---|---|---|---|
| CN | 103751919 | | 4/2014 |
| CN | 104162236 | | 11/2014 |
| CN | 203943119 | | 11/2014 |
| CN | 104826247 | | 8/2015 |
| CN | 204637356 | | 9/2015 |
| CN | 105126219 | | 12/2015 |
| CN | 105167366 | | 12/2015 |
| CN | 105476118 | | 4/2016 |
| CN | 105495776 | | 4/2016 |
| CN | 105641821 | | 6/2016 |
| CN | 205285072 | | 6/2016 |
| CN | 106039607 | | 10/2016 |
| CN | 106235464 | | 12/2016 |
| CN | 106253937 | | 12/2016 |
| CN | 106730464 | | 5/2017 |
| CN | 106847663 | | 6/2017 |
| CN | 107149182 | | 9/2017 |
| CN | 206459266 | | 9/2017 |
| CN | 107224687 | | 10/2017 |
| CN | 206577264 | | 10/2017 |
| CN | 107308564 | | 11/2017 |
| CN | 107405508 | | 11/2017 |
| CN | 107735148 | | 2/2018 |
| CN | 206995630 | | 2/2018 |
| CN | 207011751 | | 2/2018 |
| CN | 207040968 | | 2/2018 |
| CN | 207041756 | | 2/2018 |
| CN | 207152901 | | 3/2018 |
| CN | 207604526 | | 7/2018 |
| CN | 207721249 | | 8/2018 |
| CN | 207836817 | | 9/2018 |
| CN | 108635689 | | 10/2018 |
| CN | 208145256 | | 11/2018 |
| CN | 109078277 | | 12/2018 |
| CN | 208403333 | | 1/2019 |
| CN | 208611622 | | 3/2019 |
| CN | 208694061 | | 4/2019 |
| CN | 109924568 | | 6/2019 |
| CN | 111135492 | | 5/2020 |
| CN | 111565763 | | 8/2020 |
| EP | 0558147 | | 9/1993 |
| EP | 0621056 | | 10/1994 |
| EP | 2913083 | | 9/2015 |
| EP | 3446755 | | 2/2019 |
| EP | 3446756 | | 2/2019 |
| GB | 1155046 | | 6/1969 |
| JP | H05137808 | | 6/1993 |
| JP | 3039303 | | 7/1997 |
| JP | H09225012 | | 9/1997 |
| JP | 10066817 | | 3/1998 |
| JP | H10165527 | | 6/1998 |
| JP | 3077655 | | 5/2001 |
| JP | 2003322712 | | 11/2003 |
| JP | 2004364177 | | 12/2004 |
| JP | 3117209 | U | 1/2006 |
| JP | 2007236600 | | 9/2007 |
| JP | 2011078604 | | 4/2011 |
| JP | 2011078678 | | 4/2011 |
| JP | 2011115449 | | 6/2011 |
| JP | 2012-075793 | | 4/2012 |
| JP | 2013127129 | | 6/2013 |
| JP | 3196218 | | 2/2015 |
| JP | 2015093036 | | 5/2015 |
| JP | 2015-524337 | | 8/2015 |
| JP | 2015527130 | | 9/2015 |
| JP | 2016087376 | | 5/2016 |
| JP | 2018000982 | | 1/2018 |
| JP | 2018033905 | | 3/2018 |
| JP | 2018089158 | | 6/2018 |
| JP | 2018-146805 | | 9/2018 |
| JP | 2019501721 | | 1/2019 |
| KR | 10-1989-0000137 | | 3/1989 |
| KR | 10-1995-0008732 | | 8/1995 |
| KR | 20050061384 | | 6/2005 |
| KR | 20100081991 | | 7/2010 |
| KR | 20-2010-0009804 | | 10/2010 |
| KR | 1020110067854 | | 6/2011 |
| KR | 20120051735 | | 5/2012 |
| KR | 200461294 | | 7/2012 |
| KR | 101228403 | | 1/2013 |
| KR | 101536265 | | 7/2015 |
| KR | 101554664 | | 9/2015 |
| KR | 101619487 | | 5/2016 |
| KR | 20160062808 | | 6/2016 |
| KR | 20160129562 | | 11/2016 |

(56) References Cited

FOREIGN PATENT DOCUMENTS

| | | |
|---|---|---|
| KR | 20160132159 | 11/2016 |
| KR | 1020160129562 | 11/2016 |
| KR | 101733470 | 4/2017 |
| KR | 20170111132 | 10/2017 |
| KR | 20170126163 | 11/2017 |
| KR | 20180009326 | 1/2018 |
| KR | 10-2018-0012496 | 2/2018 |
| KR | 101827016 | 2/2018 |
| KR | 1020180027561 | 3/2018 |
| KR | 101849610 | 4/2018 |
| KR | 20180043234 | 4/2018 |
| KR | 20180045934 | 5/2018 |
| KR | 20180064284 | 6/2018 |
| KR | 20180091698 | 8/2018 |
| KR | 20180128040 | 11/2018 |
| KR | 10-2018-0130658 | 12/2018 |
| KR | 101925388 | 12/2018 |
| KR | 1020180135840 | 12/2018 |
| KR | 10-1942785 | 1/2019 |
| KR | 20190033299 | 3/2019 |
| KR | 1020190033299 | 3/2019 |
| KR | 10-2019-0053757 | 5/2019 |
| KR | 10-2019-0022668 | 6/2019 |
| KR | 102002878 | 7/2019 |
| KR | 1020190089188 | 7/2019 |
| KR | 1020190096496 | 8/2019 |
| KR | 102023974 | 9/2019 |
| KR | 10-2019-0119804 | 10/2019 |
| KR | 101997813 | 10/2019 |
| KR | 102065360 | 2/2020 |
| KR | 1020200033495 | 3/2020 |
| KR | 102110687 | 5/2020 |
| KR | 20200048502 | 5/2020 |
| KR | 1020200048502 | 5/2020 |
| KR | 1020200049490 | 5/2020 |
| KR | 1020200079925 | 7/2020 |
| TW | 201201879 | 1/2012 |
| TW | M555232 | 2/2018 |
| TW | 201904614 | 2/2019 |
| WO | WO 1996/22124 | 7/1996 |
| WO | WO2009067583 | 5/2009 |
| WO | WO2010070495 | 6/2010 |
| WO | WO2014020469 | 2/2014 |
| WO | WO 2016/072868 | 5/2016 |
| WO | WO2016157159 | 10/2016 |
| WO | WO20170004313 | 1/2017 |
| WO | WO2017116174 | 7/2017 |
| WO | WO2018036902 | 3/2018 |
| WO | WO2018147941 | 8/2018 |
| WO | WO 2019/059699 | 3/2019 |
| WO | WO2020055106 | 3/2020 |
| WO | WO2020094850 | 5/2020 |

OTHER PUBLICATIONS

Notice of Allowance in Korean Appln. No. 10-2020-0068407, dated Nov. 29, 2021, 4 pages (with English translation).
Office Action in Korean Appln. No. 10-2020-0068400, dated Dec. 27, 2021, 13 pages (with English translation).
Office Action in Korean Appln. No. 10-2020-0068412, dated Dec. 27, 2021, 15 pages (with English translation).
Office Action in Korean Appln. No. 10-2020-0080417, dated Dec. 28, 2021, 13 pages (with English translation).
Office Action in Korean Appln. No. 10-2020-0089132, dated Dec. 28, 2021, 13 pages (with English translation).
Office Action in Korean Appln. No. 10-2020-0068413, dated Nov. 17, 2021, 13 pages (with English translation).
Office Action in Korean Appln. No. 10-2020-0080087, dated Nov. 30, 2021, 15 pages (with English translation).
Office Action in Indian Appln. No. 202114007027, dated Jan. 5, 2022, 6 pages.
Office Action in Indian Appln. No. 202114003123, dated Jan. 6, 2022, 5 pages.
Office Action in Indian Appln. No. 202114008985, dated Jan. 12, 2022, 5 pages.
Office Action in Indian Appln. No. 202114003125, dated Jan. 13, 2022, 5 pages.
Office Action in Indian Appln. No. 202114007372, dated Jan. 24, 2022, 6 pages.
Extended European Search Report in European Appln. No. 21169778.4, dated Oct. 15, 2021, 5 pages.
Extended European Search Report in European Appln. No. 21169793.3, dated Oct. 15, 2021, 4 pages.
Extended European Search Report in European Appln. No. 21169796.6, dated Oct. 18, 2021, 4 pages.
Extended European Search Report in European Appln. No. 21169813.9, dated Oct. 20, 2021, 4 pages.
Extended European Search Report in European Appln. No. 21169817.0, dated Oct. 14, 2021, 4 pages.
Extended European Search Report in European Appln. No. 21170476.2, dated Oct. 13, 2021, 4 pages.
Extended European Search Report in European Appln. No. 21170861.5, dated Oct. 25, 2021, 4 pages.
Extended European Search Report in European Appln. No. 21169773.5, dated Sep. 24, 2021, 4 pages.
Extended European Search Report in European Appln. No. 21169777.6, dated Sep. 24, 2021, 5 pages.
Korean Office Action in Korean Appln. No. 10-2020-0068402, dated Oct. 15, 2020, 20 pages (with English translation).
Notice of Allowance in Korean Appln. No. 10-2020-0068413, dated May 31, 2022, 4 pages (with English translation).
Notice of Allowance in Korean Appln. No. 10-2020-0080087, dated Jun. 30, 2022, 5 pages (with English translation).
Office Action in Chinese Appln. No. 202011328161.5, dated Apr. 2, 2022, 15 pages (with English translation).
Office Action in Chinese Appln. No. 202110046911.8, dated Apr. 15, 2022, 12 pages (with English translation).
Office Action in Chinese Appln. No. 202110382635.2, dated Apr. 20, 2022, 12 pages (with English translation).
Office Action in Chinese Appln. No. 202110383659.X, dated Apr. 18, 2022, 13 pages (with English translation).
Office Action in Chinese Appln. No. 202110404827.9, dated Apr. 19, 2022, 13 pages (with English translation).
Office Action in Indian Appln. No. 202114011936, dated May 5, 2022, 5 pages.
Office Action in Japanese Appln. No. 2021-043251, dated May 10, 2022, 6 pages (with English translation).
Office Action in Japanese Appln. No. 2021-073811, dated May 10, 2022, 6 pages (with English translation).
Office Action in Japanese Appln. No. 2021-074825, dated Apr. 19, 2022, 6 pages (with English translation).
Office Action in Japanese Appln. No. 2021-090930, dated Jun. 14, 2022, 10 pages (with English translation).
Extended European Search Report in European Appln. No. 20217535.2, dated Jun. 22, 2021, 4 pages.
Extended European Search Report in European Appln. No.20217537.8, dated Jun. 22, 2021, 4 pages.
Office Action in Korean Appln. No. 10-2020-0068404, dated Jun. 30, 2021, 12 pages (with English translation).
Office Action in Korean Appln. No. 10-2020-0068611, dated Jun. 30, 2021, 12 pages (with English translation).
Office Action in Taiwanese Appln. No. 109146705, dated Jul. 7, 2021, 19 pages (with English translation).
Office Action in Taiwanese Appln. No. 110102539, dated Jul. 12, 2021, 10 pages (with English translation).
Office Action in Taiwanese Appln. No. 110102540, dated Jul. 12, 2021, 19 pages (with English translation).
Office Action in Taiwanese Appln. No. 110105039, dated Jul. 12, 2021, 15 pages (with English translation).
Office Action in U.S. Appl. No. 17/178,103, mailed on Jun. 30, 2023, 30 pages.
Office Action in Chinese Appln. No. 202011403700.7, dated May 4, 2023, 18 pages (with English translation).
Office Action in Chinese Appln. No. 202110096186.5, dated Jun. 3, 2023, 16 pages (with English translation).

(56) References Cited

OTHER PUBLICATIONS

Office Action in U.S. Appl. No. 17/230,206, dated Jun. 22, 2023, 18 pages.
Office Action in U.S. Appl. No. 17/231,472, dated Jun. 23, 2023, 23 pages.
Notice of Allowance in Japanese Appln. No. 2020-204668, dated Aug. 16, 2022, 5 pages (with English translation).
Office Action in Chinese Appln. No. 202110552518.6, dated Jul. 4, 2022, 18 pages (with English translation).
Decision to Grant a Patent in Japanese Appln. No. 2021-043251, dated Oct. 25, 2022, 5 pages (with English translation).
Office Action in European Appln. No. 20217533.7, dated Nov. 23, 2022, 5 pages.
Office Action in European Appln. No. 21182279.6, dated Oct. 17, 2022, 2 pages.
Office Action in Taiwanese Appln. No. 110117972, dated Oct. 7, 2022, 14 pages (with English translation).
Office Action in U.S. Appl. No. 17/170,035, dated Sep. 29, 2022, 19 pages.
Written Decision on Registration in Korean Appln. No. 10-2020-0080437, dated Oct. 22, 2022, 11 pages (with English translation).
Office Action in Japanese Appln. No. 2020-204668, dated Feb. 7, 2022, 12 pages (with English translation).
Office Action in Korean Appln. No. 10-2020-0080437, dated Feb. 21, 2022, 13 pages (with English translation).
Office Action in Korean Appln. No. 10-2020-0068421, dated Jan. 23, 2022, 12 pages (with English translation).
Office Action in Chinese Appln. No. 202011089763, mailed on Feb. 11, 2023, 18 pages (with English translation).
Office Action in Chinese Appln. No. 202011328031, mailed on Feb. 15, 2023, 18 pages (with English translation).
Office Action in Chinese Appln. No. 202110184702, mailed on Mar. 18, 2023, 23 pages (with English translation).
Office Action in Korean Appln. No. 20210129533, mailed on Mar. 28, 2023, 18 pages (with English translation).
Office Action in Korean Appln. No. 20220126062, mailed on Mar. 23, 2023, 23 pages (with English translation).
Office Action in U.S. Appl. No. 17/170,035, mailed on Feb. 8, 2023, 8 pages.
Extended European Search Report in European Appln. No. 20217533.7, dated Jun. 8, 2021, 5 pages.
Korean Office Action in Korean Appln. No. 2020-0068404, dated Apr. 5, 2021, 11 pages (with English translation).
Korean Office Action in Korean Appln. No. 2020-0068407, dated Apr. 5, 2021, 11 pages (with English translation).
Korean Office Action in Korean Appln. No. 2020-0068611, dated Apr. 5, 2021, 11 pages (with English translation).
Korean Office Action in Korean Appln. No. 2020-0109160, dated Feb. 11, 2021, 21 pages (with English translation).
Notice of Allowance in U.S. Appl. No. 17/178,103, mailed on Nov. 3, 2023, 12 pages.
Office Action in Korean Appln. No. 10-2022-0126062, mailed on Sep. 26, 2023, 8 pages (with English translation).
Office Action in U.S. Appl. No. 17/112,500, mailed on Nov. 28, 2023, 14 pages.
Office Action in U.S. Appl. No. 17/230,206, mailed on Oct. 12, 2023, 19 pages.
Office Action in U.S. Appl. No. 17/231,472, mailed on Oct. 23, 2023, 19 pages.
Office Action in U.S. Appl. No. 17/244,683, mailed on Oct. 13, 2023, 21 pages.
Notice of Allowance in U.S. Appl. No. 17/174,766, mailed on Dec. 5, 2023, 12 pages.
Notice of Allowance in U.S. Appl. No. 17/244,683, mailed on Feb. 8, 2024, 14 pages.
Office Action in Chinese Appln. No. 202110096186.5, mailed on Feb. 9, 2024, 7 pages (with English translation).
Office Action in U.S. Appl. No. 17/121,056, mailed on Dec. 21, 2023, 10 pages.
Office Action in U.S. Appl. No. 17/231,462, mailed on Dec. 28, 2023, 17 pages.
Office Action in U.S. Appl. No. 17/231,472, mailed on Feb. 27, 2024, 20 pages.

* cited by examiner

MASK APPARATUS

CROSS-REFERENCE TO RELATED APPLICATIONS

The present application claims the benefits of priority to Korean Patent Application No. 10-2020-0068413, filed on Jun. 5, 2020, the disclosure of which is incorporated herein by reference in its entirety.

TECHNICAL FIELD

The present disclosure relates to a mask apparatus.

BACKGROUND

A mask is a device that can cover a user's nose and mouth to help to prevent inhalation of germs and dust or droplet transmission by viruses or bacteria.

For example, the mask may be in close contact with the user's face to cover the user's nose and mouth. The mask may filter germs, dust, and the like, in the air and supply filtered air into the user's nose and mouth. In some cases, the mask may include a filter that filters germs and dust from the air.

In some cases, the mask may cause uncomfortable breathing since air is introduced into the user's nose and mouth through the mask, and air exhaled by the user is discharged to the outside through the mask. In some cases, a mask may include a motor, a fan, and a filter.

For example, an air suction type mask may include a face cover, a wearing portion coupled to the face cover, a filter disposed between the face cover and the wearing portion, an air passage, and a suction fan.

In some cases, saliva discharged from the user's mouth or water droplets generated by humidity inside the mask may be transmitted into the mask. Thus, the inside of the mask may not be maintained clean while the user wears the mask.

SUMMARY

The present application describes a mask apparatus that can maintain an inside of the apparatus in a clean state, and that enables a user to facilitate smooth breathing and improves convenience of use.

According to one aspect of the subject matter described in this application, a mask apparatus includes a mask body comprising an air duct disposed at a front surface of the mask body, and a fan module mounting portion disposed at a suction-side of the air duct. The mask apparatus further includes a fan module disposed at the fan module mounting portion and configured to supply external air to the air duct, a mask body cover that is coupled to the front surface of the mask body and covers the fan module and the air duct, a seal coupled to a rear surface of the mask body and configured to contact a user's face and define a breathing space for the user, a sealing bracket that fixes a portion of the seal to the rear surface of the mask body, and a pad configured to be disposed inside the breathing space.

Implementations according to this aspect can include one or more of the following features. For example, the pad can define an air-passing portion. In some examples, the air-passing portion can include a first air-passing portion configured to supply the external air introduced into the breathing space through the air duct to the user, and a second air-passing portion configured to discharge air exhaled by the user to an outside of the breathing space.

In some implementations, the first air-passing portion can include a plurality of opening holes that are defined above the second air-passing portion, and the second air-passing portion can include (i) a groove that is recessed toward the first air-passing portion from a lower end of the pad, or (ii) a hole that passes through a lower region of the pad. In some examples, the first air-passing portion can include a left air-passing portion defined at a left region of the pad with respect to a position of the seal, and a right air-passing portion defined at a right region of the pad with respect to the position of the seal.

In some implementations, the seal can include a coupling portion that is pressed by the sealing bracket and coupled to the mask body, a side surface portion that extends from the coupling portion rearward relative to the rear surface of the mask body, and a contact portion that is curved or bent from an end of the side surface portion and extends toward the coupling portion. An edge of the pad can be disposed in a space defined between the side surface portion and the contact portion.

In some implementations, the pad is configured to be detached from the breathing space. In some cases, the edge of the pad defines a size of the pad, and is configured to contact an inner surface of the side surface portion. In some examples, the edge of the pad is configured to couple to an inner surface of the side surface portion, or the pad and the side surface portion are parts of one body.

In some implementations, the pad is configured to couple to the sealing bracket, or the pad and the sealing bracket are parts of one body. The sealing bracket can include a first sealing support configured to bring the coupling portion into contact with the rear surface of the mask body, and a second sealing support disposed at an inner edge of the first sealing support. In some examples, the second sealing support extends in a direction crossing the first sealing support and supports an inner edge of the coupling portion. In some cases, the pad can be provided in one body with the first sealing support or the second sealing support.

In some implementations, the mask body can include an air outlet configured to supply air blown by the fan module to the breathing space, and air exhaust holes configured to discharge air exhaled by the user to the outside of the breathing space, where the first air-passing portion is defined at a position corresponding to the air outlet, and the second air-passing portion is defined at a position corresponding to each of the air exhaust holes.

In some implementations, the mask body cover can include a filter mounting portion that is recessed from a front surface of the mask body cover, and an air suction hole that is defined inside the filter mounting portion. In some examples, the filter mounting portion can include a first filter mounting portion defined at a right side of the mask body cover with respect to a position of the seal, and a second filter mounting portion defined at a left side of the mask body cover with respect to the position of the seal.

In some implementations, the mask apparatus can include a first filter and a second filter, where each of the first filter and the second filter can be accommodated in the first filter mounting portion or the second filter mounting portion. The mask apparatus can include a first filter cover coupled to the first filter mounting portion and configured to cover the first filter, where the first filter cover defines one or more first air inlets at a side surface of the first filter cover. The mask apparatus can include a second filter cover coupled to the second filter mounting portion and configured to cover the second filter, where the second filter cover defines one or more second air inlets at a side surface of the second filter cover.

In some implementations, the first filter cover or the second filter cover can define a filter cover opening, and include a manipulation portion disposed at the filter cover opening.

In some implementations, the mask body can define a cover coupling groove at an edge of the front surface of the mask body, where the cover coupling groove receives an edge of the mask body cover. In some implementations, the mask apparatus can include hook mounting portions disposed side ends of the mask body, and bands, where each of the bands can be connected to one of the hook mounting portions and configured to surround an occipital region of the user or an ear of the user.

The details of one or more implementations are set forth in the accompanying drawings and the description below. Other features will be apparent from the description and drawings, and from the claims.

DETAILED DESCRIPTION

Hereinafter, one or more implementations of a mask apparatus will be described in detail with reference to the drawings.

Figure 1:
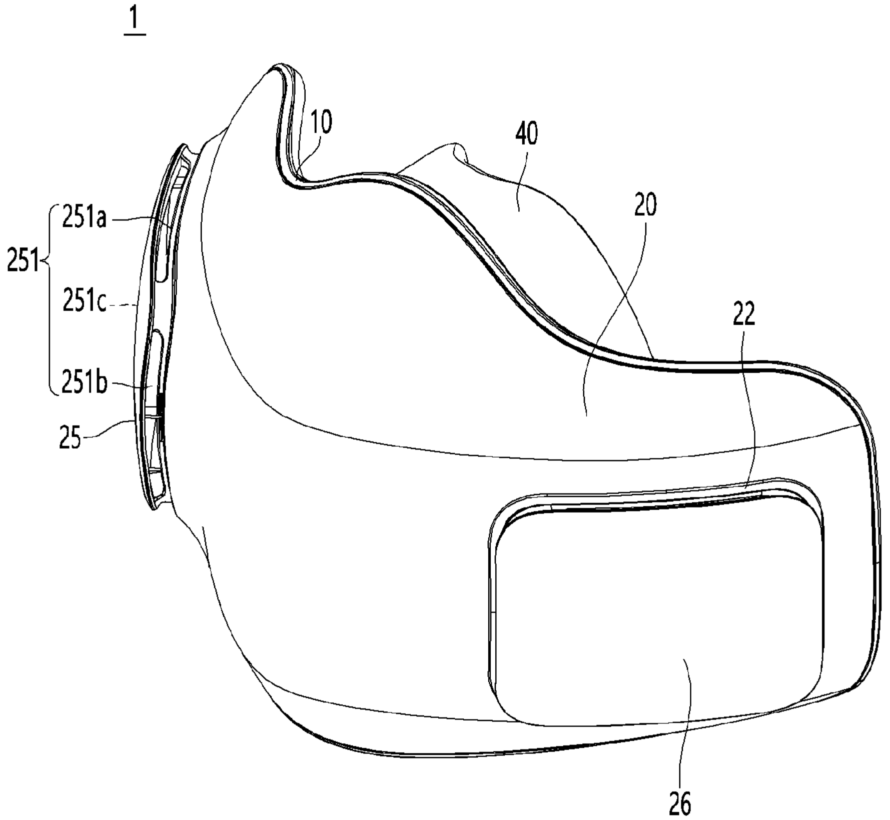
FIG. 1 is a left perspective view showing an example of a mask apparatus.
Figure 2:
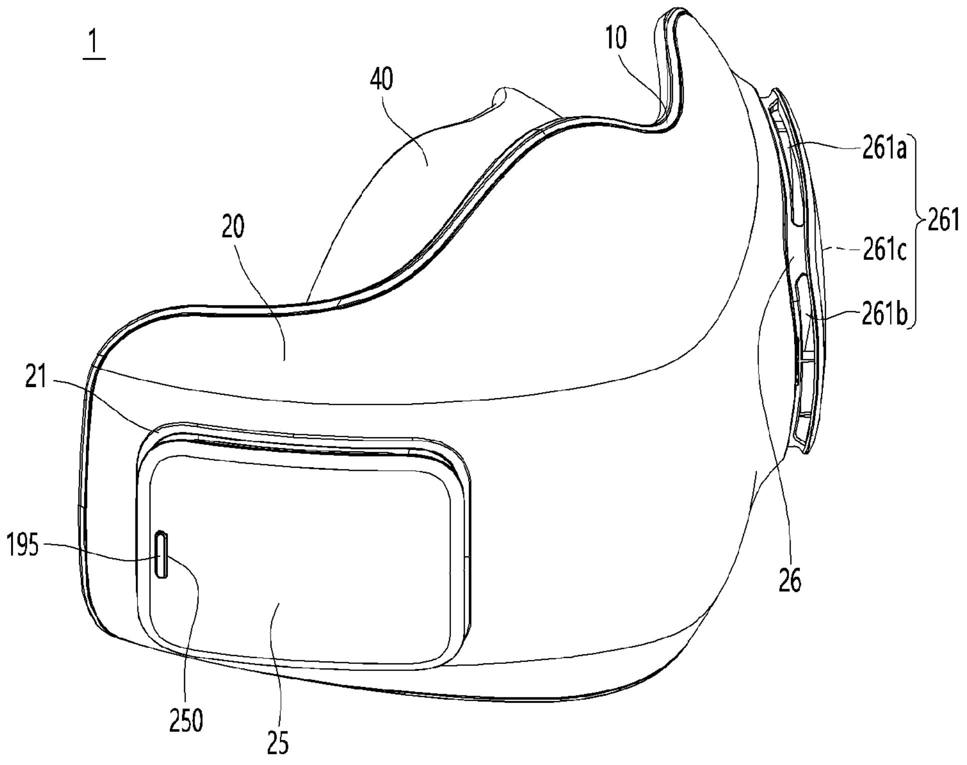
FIG. 2 is a right perspective view showing the mask apparatus.
Figure 3:
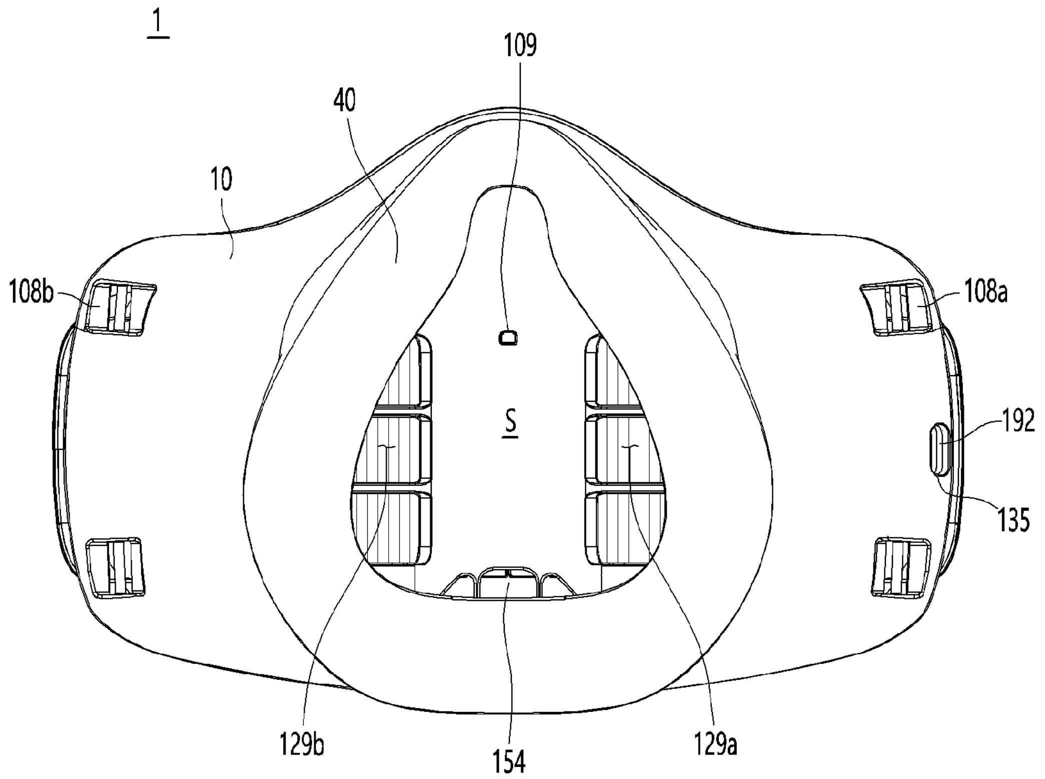
FIG. 3 is a rear view showing the mask apparatus.
Figure 4:
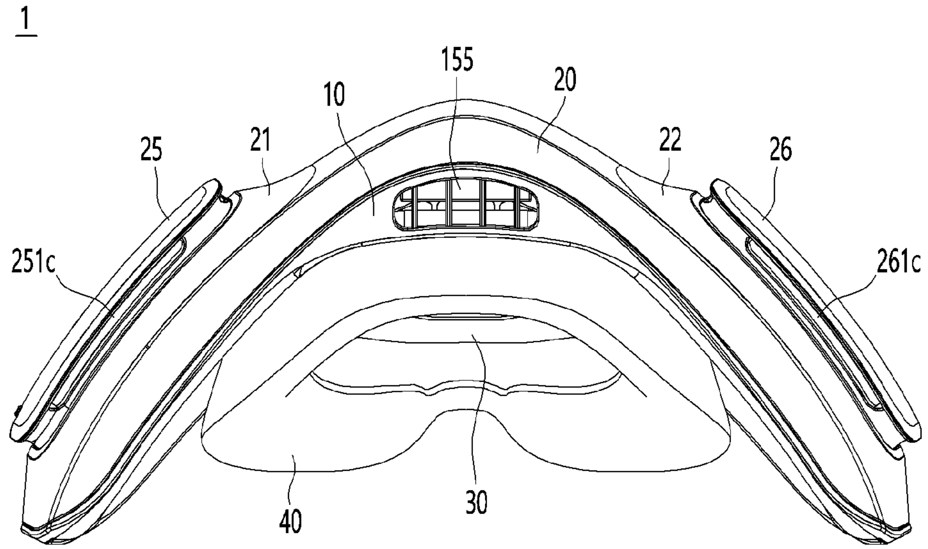
FIG. 4 is a bottom view showing the mask apparatus.

FIG. 1 is a left perspective view showing an example of a mask apparatus, FIG. 2 is a right perspective view showing the mask apparatus, FIG. 3 is a rear view showing the mask apparatus, and FIG. 4 is a bottom view showing the mask apparatus.

Referring to FIGS. 1 to 4, a mask apparatus 1 can include a mask body 10 and a mask body cover 20 coupled to the mask body 10.

The mask body 10 and the mask body cover 20 can be detachably coupled to each other. When the mask body 10 and the mask body cover 20 are coupled to each other, an inner space can be defined between the mask body 10 and the mask body cover 20. Constituents for driving the mask apparatus 1 can be disposed in the inner space. The inner space can be defined between a front surface of the mask body 10 and a rear surface of the mask body cover 20. The mask body 10 can define a rear surface of the mask apparatus 1, and the mask body cover 20 can define a front surface of the mask apparatus 1.

A rear side of the mask apparatus 1 is defined as a direction in which the rear surface of the mask apparatus 1 facing a user's face is disposed, and a front side of the mask apparatus 1 is defined as a direction which is opposite to the rear side and in which a front surface of the mask apparatus, which is exposed to the outside, is disposed.

The mask apparatus 1 can further include a sealing bracket 30 and a seal 40 that is detachably coupled to the sealing bracket 30.

The sealing bracket 30 can be detachably coupled to a rear surface of the mask body 10 to fix the seal 40 to the rear surface of the mask body 10. In some examples, when the sealing bracket 30 is separated from the rear surface of the mask body 10, the seal 40 can be separated from the mask body 10.

The seal 40 can be supported on the rear surface of the mask body 10 by the sealing bracket 30, and a breathing space S for breathing can be defined between the seal 40 and the rear surface of the mask body 10. The seal 40 can be in close contact with a user's face and can surround user's nose and mouth to restrict introduction of external air into the breathing space S.

The mask body cover 20 can include a first filter mounting portion 21 and a second filter mounting portion 22. The first filter mounting portion 21 can be disposed at a right side of the mask body cover 20, and the second filter mounting portion 22 can be disposed at a left side of the mask body cover 20.

A left direction (left side) and a right direction (right side) are defined based on the mask apparatus 1 worn on the user's face. That is, in the state in which the user wearing the mask apparatus 1, a right side of the user is defined as the right side of the mask apparatus 1, and a left side of the user is defined as the left side of the mask apparatus 1.

In some examples, an upward direction (upward side) and a downward direction (downward side) are defined based on the mask apparatus 1 mounted on the user's face.

A first filter cover 25 can be mounted on the first filter mounting portion 21, and a second filter cover 26 can be mounted on the second filter mounting portion 22. Filters 23 and 24 (see FIG. 5) can be disposed inside the first filter mounting portion 21 and the second filter mounting portion 22, and the first filter cover 25 and the second filter cover 26 can cover the filter.

The first filter cover 25 and the second filter cover 26 can be detachably coupled to the first filter mounting portion 21 and the second filter mounting portion 22. For example, the first filter cover 25 and the second filter cover 26 can be coupled to be fitted into the first filter mounting portion 21 and the second filter mounting portion 22, respectively.

Each of the first filter cover 25 and the second filter cover 26 can include a front surface portion and side surface portions extending backward along an edge of the front surface portion or an edge of a rear surface.

Each of the side surface portions of the first filter cover 25 and the second filter cover 26 can have four side surfaces, and the four side surfaces can include an upper side surface, a lower side surface, a left side surface, and a right side surface.

One or a plurality of first air inlets 251 can be defined in the side surface portion of the first filter cover 25. One or a plurality of second air inlets 261 can also be defined in the side surface portion of the second filter cover 26.

In the state in which the first filter cover 25 is mounted on the first filter mounting portion 21, the first air inlet 251 can be defined to be exposed to the outside. In the state in which the second filter cover 26 is mounted on the second filter mounting portion 22, the second air inlet 261 can be defined to be exposed to the outside.

The first air inlet 251 and the second air inlet 261 can be defined in the side surfaces of the first filter cover 25 and the second filter cover 26, respectively. In some implementations, each of the first and second air inlets 251 and 261 can be respectively defined in the front surface portions of the first and second filter covers 25 and 26.

The first air inlet 251 and the second air inlet 261 can be defined at a point closer to the front surface portion from a line that bisects the side surface portion.

When a plurality of the first air inlets 251 are provided in the side surface portions of the first filter cover 25, the first air inlets 251 can include a first air inlet 251*a* defined in the right side surface, a second air inlet 251*b* defined in the left side surface, and a third air inlet 251*c* defined in the upper side surface.

Similarly, when a plurality of the second air inlets 261 are provided in the side surface portions of the second filter cover 26, the second air inlets 261 can include a first air suction hole 261*a* defined in the left side surface, a second air suction hole 261*b* defined in the right side surface, and a third air suction hole 261*c* defined in the upper side surface.

An opening 250 can be defined in one of the first filter cover 25 and the second filter cover 26, and the opening 250 can be defined in an edge of one of the first filter cover 25 and the second filter cover 26. In some examples, a manipulation portion 195 for controlling an operation of the mask apparatus 1 can be mounted in the opening 250. In some implementations, the manipulation portion 195 is mounted on the first filter cover 25 as an example.

The manipulation portion 195 can serve as a manipulation switch that turns on/off power of the mask apparatus 1. The manipulation portion 195 can be exposed to the front side of the mask apparatus 1 while being mounted in the opening 250.

The mask body 10 can include a hook mounting portion 108. The hook mounting portion 108 can be provided on the left and right sides of the mask body 10.

That is, the hook mounting portion 108 can include a first hook mounting portion 108*a* provided at a right side of the mask body 10, and a second hook mounting portion 108*b* provided at a left side of the mask body 10.

Each of the first hook mounting portion 108*a* and the second hook mounting portion 108*b* can be provided in plurality to be spaced apart from each other in a vertical direction of the mask body 10. In detail, the first hook mounting portion 108*a* can be provided at each of the upper right and lower right sides of the mask body 10, and the second hook mounting portion 108*b* can be provided at each of the upper left and lower left sides of the mask body 10.

Bands for maintaining the mask apparatus 1 in close contact with the user's face can be coupled to the hook mounting portion 108.

For example, both ends of each of the bands can connect the first hook mounting portion 108*a* to the second hook mounting portion 108*b*. In some examples, two bands can respectively connect two first hook mounting portions 108*a* to two second hook mounting portions 108*b*. The two first hook mounting portions 108*a* can be spaced apart from each other in the vertical direction, and the two second hook mounting portions 108*b* spaced apart from each other in the vertical direction.

In the former case, the band can have a shape surrounding the user's occipital region, and in the latter case, the band can have a shape that is hooked on both ears of the user.

The hook mounting portion 108 can be formed by cutting a portion of the mask body 10. Thus, air can be introduced into the inner space between the mask body 10 and the mask body cover 20 through a gap defined in the hook mounting portion 108.

In detail, the external air introduced into the inner space through the hook mounting portion 108 can cool electronic components disposed in the inner space. In some examples, the air of which a temperature increases while cooling the electronic components can be discharged again to the outside of the mask body 10 through the hook mounting portion 108. In some examples, to restrict a flow of the air introduced into the inner space through the hook mounting portion 108 into the breathing space, the inside of the mask apparatus 1 can have a sealing structure.

The mask body 10 can include an air outlet 129 for supplying the filtered air to the breathing space. The user can breathe while breathing the filtered air supplied through the air outlet 129 to the breathing space.

The air outlet 129 can include a first air outlet 129*a* through which the filtered air introduced into the first air inlet 251 is discharged to the breathing space S and a second air outlet 129*b* through which the filtered air introduced into the second air inlet 261 is discharged to the breathing space S.

The first air outlet 129*a* can be defined at a right side with respect to a center of the mask body 10, and the second air outlet 129*b* can be defined at a left side with respect to the center of the mask body 10. The air introduced through the first air inlet 251 can pass through the filter 23 and then flow to the first air outlet 129*a*. The air introduced through the second air inlet 261 can pass through the filter 24 and then flow to the second air inlet 261.

The mask body 10 can include air exhaust holes 154 and 155 for discharging air exhaled by the user to an external space. The air exhaust holes 154 and 155 can be defined in a lower portion the mask body 10.

The air exhaust holes 154 and 155 can include a first air exhaust hole 154 defined in a front lower end of the mask body 10 and a second air exhaust hole 155 defined in a bottom surface of the mask body 10.

In detail, a rib extending forward can be formed at the front lower end of the mask body 10, and a surface defined by the rib can be defined as the bottom surface of the mask body 10.

A flow space through the air flowing toward the second air exhaust hole 155 by passing through the first air exhaust hole 154 descends can be defined between the mask body 10 and the mask body cover 20.

In some implementations, a check valve can be provided in one or more of the first air exhaust hole 154 and the second air exhaust hole 155. The external air can be introduced into the breathing space, or the air discharged through the second air exhaust hole 155 can be restricted from flowing backward by the check valve.

The check valve can be disposed in the flow space between the first air exhaust hole 154 to the second air exhaust hole 155.

For example, the check valve in a form of a flat flap having a size and shape corresponding to the size and shape of the first air exhaust hole 154 can be provided.

In detail, an upper end of the flap can be connected to an upper edge of the first air exhaust hole 154, and when the user exhales, the flap can be bent or rotate to open the first air exhaust hole 154, and when the user inhales, the flap can be in close contact with the first air exhaust hole 154 to restrict introduction of the external air or the discharged air back into the breathing space.

The mask body 10 can include a sensor mounting portion 109. The sensor mounting portion 109 can be equipped with a sensor for acquiring various pieces of information from the breathing space. The sensor mounting portion 109 can be disposed above the mask body 10. When the user breathes, the sensor mounting portion 109 can be disposed above the mask body 10 in consideration of a position at which a pressure change in the breathing space is constantly sensed.

The mask body 10 can include a connector hole 135. The connector hole 135 can be understood as an opening in which a connector 192 for supplying power to the mask apparatus 1 is installed. The connector hole 135 can be defined at either a left edge or a right edge of the mask body 10.

In some implementations, since the manipulation portion 195 and the connector 192 are connected to a power module 19 (see FIG. 5) to be described later, the connector hole 135 can be provided at one side of the left or the right side of the mask body 10, which corresponds to the position at which the power module 19 is installed.

Hereinafter, constituents of the mask apparatus 1 will be described in detail based on an exploded perspective view.

Figure 5:
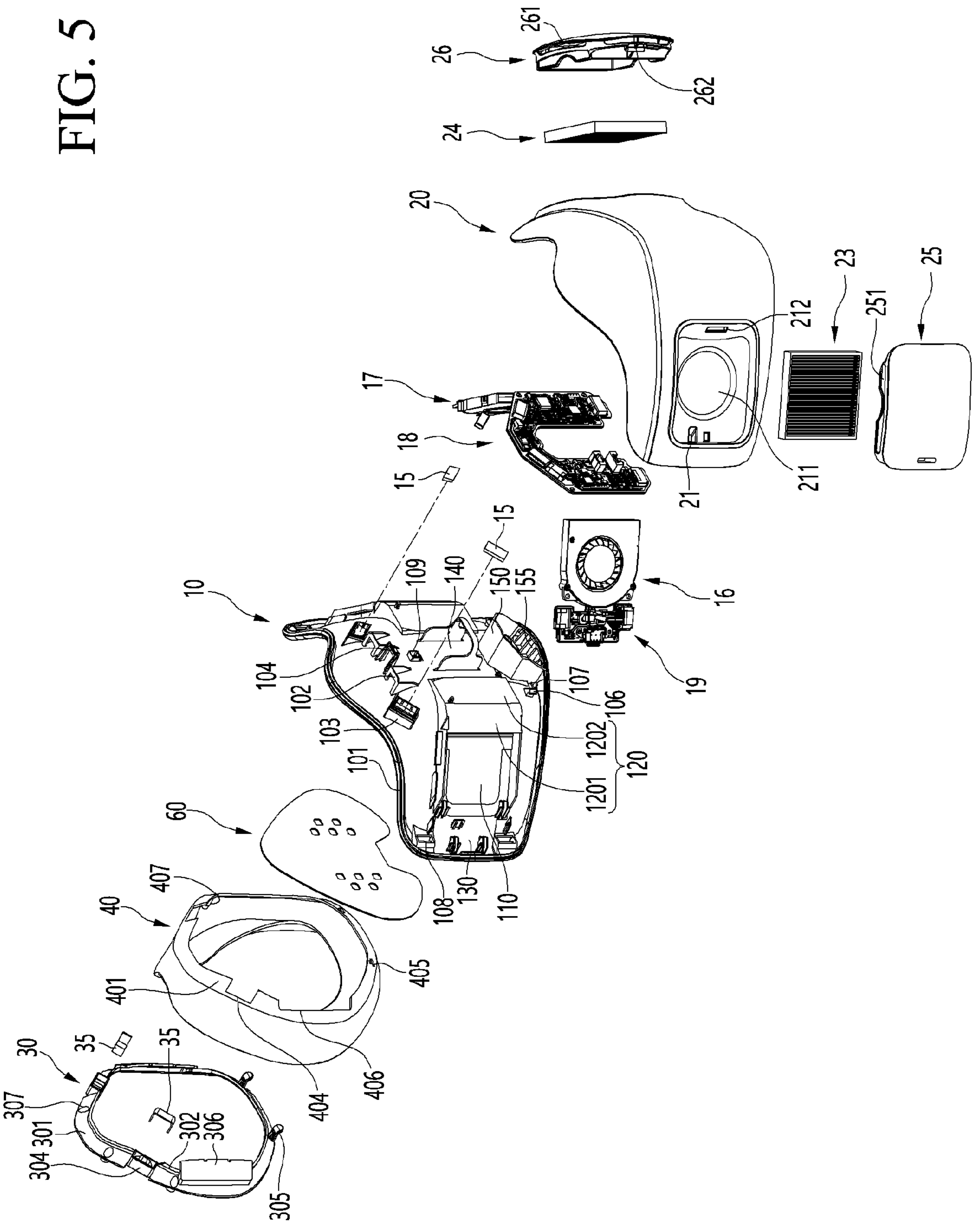
FIG. 5 is an exploded perspective view showing the mask apparatus.

FIG. 5 is an exploded perspective view showing the mask apparatus.

Referring to FIG. 5, the mask apparatus 1 can include the mask body 10, the mask body cover 20, the sealing bracket 30, and the seal 40.

In detail, the mask body 10 and the mask body cover 20 can be coupled to each other to form an outer appearance of the mask apparatus 1.

An inner space for accommodating components for the operation of the mask apparatus 1 can be defined between the mask body 10 and the mask body cover 20. The sealing bracket 30 and the seal 40 are coupled to the rear surface of the mask body 10 to define the breathing space between the user's face and the mask body 10. The seal 40 can help to restrict introduction of the external air into the breathing space.

The mask body 10 can include a cover coupling groove 101. The cover coupling groove 101 can be defined along a front edge of the mask body 10. The cover coupling groove 101 can be defined by a height difference. The cover coupling groove 101 can be defined to correspond to an edge of the mask body cover 20. The cover coupling groove 101 can be defined by recessing a portion of the front surface of the mask body 10 backward. The mask body cover 20 can move toward the cover coupling groove 101 of the mask body 10 to allow the mask body cover 20 to be inserted into the cover coupling groove 101.

The mask body 10 can include a first cover coupling portion 102. An upper portion of the mask body cover 20 can be supported on the first cover coupling portion 102. The first cover coupling portion 102 can be disposed on a front upper portion of the mask body 10.

For example, the first cover coupling portion 102 can have a structure that is capable of being hook-coupled. The hook coupled to the first cover coupling portion 102 can be disposed on a rear surface of the mask body cover 20.

The first cover coupling portion 102 can be provided in plurality, and the hook can also be provided in plurality to correspond to the first cover coupling portions 102. In some implementations, the first cover coupling portion 102 can be provided at the left and right sides of the mask body 10 based on the center of the mask body 10. The first cover coupling portion 102 can be referred to as an upper cover coupling portion.

The mask body 10 can include a first bracket coupling portion 103. The first bracket coupling portion 103 can be disposed above the mask body 10. The first bracket coupling portion 103 can support an upper portion of the sealing bracket 30.

For example, the first bracket coupling portion 103 is configured to couple the sealing bracket 30 to the mask body 10 by magnetic force. For this, the first bracket coupling portion 103 can include a first magnetic member 15. The first magnetic member 15 can include a magnet or a metal attached to the magnet.

The first magnetic member 15 can be fixed to the front surface of the mask body 10, and the sealing bracket 30 can contact the rear surface of the mask body 10. In some implementations, the first bracket coupling portion 103 can be provided in a rib shape in which the front surface of the mask body 10 protrudes forward to surround the first magnetic member 15. The first magnetic member 15 can be fitted and fixed to the first bracket coupling portion 103 provided in the rib shape. In some implementations, the first magnetic member 15 will be described as being provided as the magnet.

The first bracket coupling portion 103 can be provided at each of the left and right sides of the mask body 10. The first bracket coupling portion 103 can be defined as an upper bracket coupling portion.

The first magnetic member 15 can include a right first magnetic member mounted on the right first bracket coupling portion 103 and a left first magnetic member mounted on the left first bracket coupling portion 103.

A first body coupling portion 304 can be disposed on the sealing bracket 30, and a second magnetic member 35 can be mounted on the first body coupling portion 304 so that the sealing bracket 30 is coupled to the mask body 10 by magnetic force of the first magnetic member 15.

The first body coupling portion 304 can be provided to firmly fix the second magnetic member 35. The second magnetic member 35 can include a magnet or a metal attached to the magnet. In some implementations, the second magnetic member 35 is described as being made of the metal, but the first magnetic member 15 and the second magnetic member 35 can be made of opposite materials. That is, one of the first magnetic member 15 and the second magnetic member 35 can be a magnet, and the other can be a metal adhered to the magnet.

The first body coupling portion 304 can be provided in plurality to correspond to the plurality of first bracket coupling portions 103. The mask body 10 can include a support rib 104.

The support rib 104 can be provided to protrude forward from the front surface of the mask body 10. The support rib 104 can contact the rear surface of the mask body cover 20 when the mask body cover 20 is coupled to the mask body 10.

The mask body 10 and the mask body cover 20 can resist external forces acting in a front and rear direction by the support rib 104. The support ribs 104 can be provided in a plurality on the front surface of the mask body 10.

The support rib 104 can perform a function of fixing a portion of the control module 18 mounted on the mask body 10. For this, the support rib 104 can include a hook shape.

In other words, a hook protrusion can protrude from an end of the support rib 104 to fix the end of the control module 18.

The mask body 10 can include a second cover coupling portion 106.

A lower portion of the mask body cover 20 can be supported on the second cover coupling portion 106. The second cover coupling portion 106 can protrude in a hook shape from a front lower portion of the mask body 10. The first cover coupling portion 102 can be provided at each of the left and right sides of the mask body 10 based on the center of the mask body 10. The second cover coupling portion 106 can be defined as a lower cover coupling portion.

A hook hooking portion to which the second cover coupling portion 106 is coupled can be disposed on each of the left and right sides of the mask body cover 20 on the rear surface of the mask body cover 20.

The mask body 10 can include a second bracket coupling portion 107.

A lower portion of the sealing bracket 30 can be supported on the second bracket coupling portion 107. The second bracket coupling portion 107 can be provided by opening the mask body 10. The second bracket coupling portion 107 can be disposed in a lower portion of the mask body 10. For example, the second bracket coupling portion 107 can be provided as a through-hole defined in the mask body 10.

A second body coupling portion 305 coupled to the second bracket coupling portion 107 can be disposed on the sealing bracket 30. The second bracket coupling portion 107 can be provided in plurality, and the second body coupling portion 305 can also be provided in plurality to correspond to the second bracket coupling portions 107. In some implementations, the second bracket coupling portion 107 can be provided at each of the left and right sides with respect to the center of the mask body 10. The second bracket coupling portion 107 can be defined as a lower bracket coupling portion.

The mask body 10 can include the above-described sensor mounting portion 109.

The sensor mounting portion 109 can have a rib shape in which a portion of the front surface of the mask body 10 protrudes forward. In detail, the sensor mounting portion 109 has a rib shape that is surrounded along an edge of the sensor, and an installation space in which the sensor is installed is defined in the sensor mounting portion 109.

A hole through which the installation space and the breathing space communicate with each other is defined in the mask body 10 corresponding to the inside of the sensor mounting portion 109. The sensor disposed in the installation space can include a pressure sensor, and the pressure sensor can sense pressure information of the breathing space through the hole.

The mask body 10 can include a fan module mounting portion 110.

The fan module mounting portion 110 can include a first fan module mounting portion on which a first fan module 16 is mounted and a second fan module mounting portion on which a second fan module 17 is mounted.

The first fan module mounting portion and the second fan module mounting portion can be disposed on the front surface of the mask body 10. In detail, the first fan module mounting portion can be disposed at the right side of the mask body 10, and the second fan module mounting portion can be disposed at the left side of the mask body 10.

The first fan module 16 and the second fan module 17 can be detachably coupled to the first fan module mounting portion and the second fan module mounting portion, respectively.

The mask body 10 can include an air duct 120.

The air duct 120 can be disposed on the front surface of the mask body 10.

A passage through which air passes can be provided in the air duct 120. The fan module mounting portion 110 can be disposed at a suction-side of the air duct 120. The suction-side of the air duct 120 can be defined as any location where the air duct 120 introduces air therein. For instance, the suction-side may be a lateral side, a top side, a bottom side, a front side, or a rear side, etc. of the air duct 120.

The air duct 120 can include a first air duct connected to the first fan module mounting portion and a second air duct connected to the second fan module mounting portion.

The first air duct and the second air duct can be respectively disposed on an edge of the first fan module mounting portion and an edge of the second fan module mounting portion, which are adjacent to the center of the front surface of the mask body 10 so as to be disposed between the first fan module mounting portion and the second fan module mounting portion.

In some examples, the first fan module mounting portion and the second fan module mounting portion can have a shape symmetrical with respect to a vertical plane (or a vertical line) passing through the center of the front surface of the mask body 10. Similarly, the first air duct and the second air duct can also have a shape symmetrical with respect to the vertical plane or the vertical line passing through the center of the front surface of the mask body 10.

One end of the air duct 120 communicates with the outlets of the fan modules 16 and 17 to allow the external air to be introduced into the air duct 120. In addition, the other end of the air duct 120 communicates with the air outlet 129 so that the external air introduced into the air duct 120 is discharged into the breathing space S.

A control module 18 can be mounted on the front surface of the air duct 120.

A portion of the air duct 120 can be provided as a curved portion 1201, and the remaining portion of the air duct 120 can be provided as a flat portion 1202. The control module 18 can be fixed to the flat portion 1202. The curved portion 1201 of the air duct 120 contacts the fan module mounting portion 110 to allow the external air to be introduced, and the flat portion 1202 contacts the air outlet 129 to allow the introduced external air to be supplied to the breathing space S.

It can be described that the control module 18 is disposed in front of the flat portion, and a passage of the air duct 120 is disposed at a rear side.

A front surface of the flat portion 1202 can be defined as a control module seating portion on which the control module 18 is seated. In some examples, an uneven portion 122 to be described in FIG. 9 can be disposed on a rear surface of the flat portion 1202.

The mask body 10 can include a power module mounting portion 130 for mounting the power module 19.

The power module mounting portion 130 can be disposed on the front surface of the mask body 10. The power module mounting portion 130 can be provided at one of the left and the right side of the mask body 10.

The power module mounting portion 130 can be disposed at the side of the fan module mounting portion 110. Specifically, the power module mounting portion 130 can be provided between the fan module mounting portion 110 and a side end of the mask body 10. The side end of the mask body 10 can be defined as an end adjacent to the user's ear when worn. In some examples, a connector hole 135 can be defined in the side end of the mask body 10 provided with the power module mounting portion 130.

The mask body 10 can include a battery mounting portion 140 for mounting a battery.

The battery mounting portion 140 can be disposed at a center of the front surface of the mask body 10. The battery mounting portion 140 can be provided to protrude forward from the front surface of the mask body 10 so as to surround the battery.

For example, the battery mounting portion 140 can include a pair of guide ribs protruding forward from the front surface of the mask body 10 and a connection rib connecting front ends of the pair of guide ribs to each other. In some examples, the battery can be mounted in a battery accommodation space defined by the pair of guide ribs and the connection rib.

The battery can move downward from an upper side of the battery accommodating space and be inserted into the battery accommodating space and then can move in a reverse direction to be separated. A lower portion of the battery inserted into the battery mounting portion 140 can be supported by an air discharge portion 150 to be described later.

The mask body 10 can include the air discharge portion 150.

The air discharge portion 150 can be disposed in a lower portion of the mask body 10. The air discharge portion 150 can define a flow space through which the air flowing from the first air exhaust hole 154 toward the second air exhaust hole 155 passes.

The air discharge portion 150 can protrude forward from the front surface of the mask body 10. In some examples, the air discharge portion 150 can extend to be rounded in an arch shape or can be bent several times to extend.

When the mask body cover 20 is coupled to the mask body 10, a front end of the air discharge portion 150 can contact the rear surface of the mask body cover 20, and the inner space of the mask body 10 and the flow space can be distinguished from each other.

The air discharge portion 150 can define a top surface and both side surfaces of the flow space, and a rear surface of the mask body cover 20 can define a front surface of the flow space. In some examples, the front surface of the mask body 10 can define a rear surface of the flow space, and the bottom surface of the mask body 10 on which the second air exhaust hole 155 is defined can define a bottom surface of the flow space.

The top surface of the air discharge portion 150 can support a lower end of the battery. It is connected to lower ends of both sides of the air discharge portion 150 having the arch shape or tunnel shape can be connected to the bottom surface of the mask body 10, and the bottom surface of the mask body 10 can be defined by the rib extending forward from the lower end of the front surface of the mask body 10.

The cover coupling groove 101 is recessed along the front end of the rib defining the bottom surface of the mask body 10, and the lower end of the rear surface of the mask body cover 20 is coupled to the cover coupling groove 101.

The first air exhaust hole 154 can be defined in the front surface of the mask body 10 defining the rear surface of the flow space.

The mask body cover 20 can include a pair of filter mounting portions 21 and 22, as described above.

The filter mounting portions 21 and 22 can be provided by recessing the front surface of the mask body cover 20 to be recessed by a predetermined depth toward the rear surface of the mask body cover 20. Filters 23 and 24 are accommodated inside the filter mounting portions 21 and 22 provided by being recessed, and filter covers 25 and 26 can be mounted on edges of the filter mounting portions 21 and 22 in the state in which the filters 23 and 24 are accommodated.

Air suction holes 211 and 221 can be defined in the filter mounting portions 21 and 22. The air suction holes 211 and 221 can communicate with fan suction holes defined in bottom surfaces of the fan modules 16 and 17, respectively. Each of edges of the air suction holes 211 and 221 can have an inclined surface that inclined in a direction in which a diameter gradually decreases from the front surface to the rear surface.

Filter cover mounting grooves 212 and 222 for fixing the filter covers 25 and 26 can be defined in side surfaces of the filter mounting portions 21 and 22. Coupling protrusions inserted into the filter cover mounting grooves 212 and 222 can be disposed on the filter covers 25 and 26. In FIG. 5, only the coupling protrusion 262 disposed on the left filter cover 26 is illustrated, but the same coupling protrusion can be disposed on the right filter cover 25 as well.

A sealing material for sealing can be provided between the edges of the rear surfaces of the air suction holes 211 and 221 of the filter mounting portions 21 and 22 and the fan suction holes of the fan modules 16 and 17. The sealing material can surround the air suction holes 211 and 221 and edges of the fan suction holes of the fan modules 16 and 17 to restrict introduction of the external air.

Alternatively, instead of providing the sealing material, an orifice is disposed on each of the edges of the air suction holes 211 and 221, and the orifice can be in close contact with the edges of the fan suction holes of the fan module 16 and 17 to the external air from being introduced. The orifice can be understood as a guide rib extending or protruding backward along the edges of the air suction holes 211 and 221.

The filter mounting portions 21 and 22 include a first filter mounting portion 21 provided at the right side of the mask body cover 20 and a second filter mounting portion 22 provided at the left side of the mask body cover 20.

The air suction hole defined in the first filter mounting portion 21 can be defined as a first air suction hole 211, and the air suction hole defined in the second filter mounting portion 22 can be defined as a second air suction hole 221.

The filters 23 and 24 can include a first filter 23 accommodated inside the first filter mounting portion 21 and a second filter 24 accommodated inside the second filter mounting portion 22.

The filter covers 25 and 26 can include a first filter cover 25 mounted on the first filter mounting portion 21 and a second filter cover 26 mounted on the second filter mounting portion 22. A plurality of first air inlets 251 can be defined in the first filter cover 25 to allow the external air to be introduced, and a plurality of second air inlets 261 can be defined in the second filter cover 26 to allow the external air to be introduced.

The control module 18 can be referred to as a first electronic circuit component, and the power module 19 can be referred to as a second electronic circuit component.

The fan modules 16 and 17 can include a fan, a fan motor, and a fan housing accommodating the fan and the fan motor. The fan housing can include a fan suction hole through which the air is introduced into the fan, and a fan outlet through which the air forcedly flowing by the fan is discharged.

In some examples, the fan includes a centrifugal fan that suctions air from the front side of the mask body cover 20 and discharges the air to the side of the mask body 10. In some examples, the fan can include the axial fan or the cross flow fan.

The air introduced through the first air inlet 251 to pass through the first filter 23 is suctioned through the first air suction hole 211. In some examples, the air introduced through the second air inlet 261 to pass through the second filter 24 is suctioned through the second air suction hole 221.

The fan outlet of the first fan module 16 can communicate with the first air duct to discharge the air to the breathing space, and the fan outlet of the second fan module 17 can communicate with the second air duct to discharge the air to the breathing space.

The control module 18 can control an operation of the mask apparatus 1. The control module 18 can be fixed to a control module mounting portion (e.g., the flat portion 1202).

The control module 18 can include a communication module to transmit and receive various types of information. The control module 18 can include a data storage module to store various types of information.

The control module 18 can control an operation of each of the fan modules 16 and 17. In detail, the control module 18 can control the operation of each of the fan modules 16 and 17 based on information sensed from the sensor.

The control module 18 can be electrically connected to the power module 19, the fan modules 16 and 17, and the battery so as to be interlocked with each other.

The power module 19 can receive power from the outside. The power module 19 can include a charging circuit for charging the battery. The power module 19 can include the connector 192 (see FIG. 8) and the manipulation portion 195. Thus, the control module 18 can operate by receiving battery power or external power through the connector 192.

The power module 19 can control supply of power to the mask apparatus 1 by the manipulation portion 195. In detail, the power module 19 can control supply of power from the battery to the control module 18 and the fan modules 16 and 17.

The seal 40 can be coupled to the rear surface of the mask body 10 by the sealing bracket 30 to be in close contact with the user's face.

The rear surface of the mask body 10 can be to be spaced apart from the user's face by the seal 40.

The sealing bracket 30 can be provided in a ring shape forming a closed loop.

The seal 40 can be detachably coupled to the sealing bracket 30.

In some examples, the sealing bracket 30 is coupled to be detachable from the mask body 10 to separate the sealing bracket 30 from the mask body 10. With this structure, only the sealing bracket 30 is separated, or an assembly of the seal 40 and the sealing bracket 30 is separated from the mask body 10 to clean only the sealing bracket 30 or clean both the sealing bracket 30 and the seal 40.

After the seal 40 is coupled to the sealing bracket 30, when the sealing bracket 30 is coupled to the mask body 10, the seal 40 is stably fixed to the mask body 10.

The sealing bracket 30 can include a first sealing support 301 supporting the seal 40.

The first sealing support 301 can be provided in a closed loop shape and have a predetermined width and also be provided in a rib shape that is in surface contact with the seal 40.

The first sealing support 301 can have a rib shape of which a thickness gradually decreases from an inner edge to an outer edge. That is, the first sealing support 301 can have a triangular cross-sectional shape in which a thickness of the first sealing support 301 gradually decreases toward the outer side in a radial direction.

The sealing bracket 30 can include a second sealing support 302.

The second sealing support 302 can extend along an inner edge of the first sealing support 301. The second sealing support 302 can be surrounded along the first sealing support 301 at the inner edge of the first sealing support 301 and can have a predetermined width in a direction crossing the first sealing support.

When the seal 40 comes into contact with the first sealing support 301 and the second sealing support 302, it can be understood that the seal 40 is normally coupled to the sealing bracket 30. When the sealing bracket 30 is coupled to the mask body 10, the seal 40 can be in close contact with the rear surface of the mask body by the first sealing support 301 and the second sealing support 302. The second sealing support 302 can also perform a rib function to improve durability of the first sealing support 301.

The sealing bracket 30 can include a bracket insertion portion 306 coupled to the mask body 10. The bracket insertion portion 306 is inserted into a cutoff portion 127 (see FIG. 9) defined in the mask body 10 to shield a portion of an edge of the cutoff portion 127.

The cutoff portion 127 can be understood as an opening communicating with the air duct 120 so that the air passes therethrough. The bracket insertion portion 306 can be disposed on one edge of the cutoff portion 127, specifically, an outer edge.

The air outlet 129 already described can be understood as the remaining portion of the cutoff portion 127 that is not covered by the bracket insertion portion 306 in a state in which the bracket insertion portion 306 is inserted into one side of the cutoff portion 127.

When the bracket insertion portion 306 is inserted into or coupled to the one side of the cutoff portion 127 to shield the one side of the cutoff portion 127, the air discharged from the fan modules 16 and 17 can pass between the air duct 120 and the bracket insertion portion 306 to flow to the air outlet 129.

The bracket insertion portion 306 can serve as a function of fixing the sealing bracket 30 to the mask body 10 while defining one surface of the air duct 120. In detail, an upper portion of the sealing bracket 30 can be fixed to the upper portion of the mask body 10 by the first body coupling portion 304, a lower portion of the sealing bracket 30 can be fixed to the lower portion of the mask body 10 by the second body coupling portion 305, and an intermediate portion of the sealing bracket 30 can be fixed to an intermediate portion of the mask body 10 by the bracket insertion portion 306.

The sealing bracket 30 can include a sealing insertion portion 307.

The sealing insertion portion 307 can be provided in the first sealing support 301. A sealing protrusion 407 disposed on the seal 40 can be inserted into the sealing insertion portion 307.

The sealing protrusion 407 can be inserted into the sealing insertion portion 307 so that the sealing bracket 30 and the seal 40 are coupled to form one body.

Figure 9:
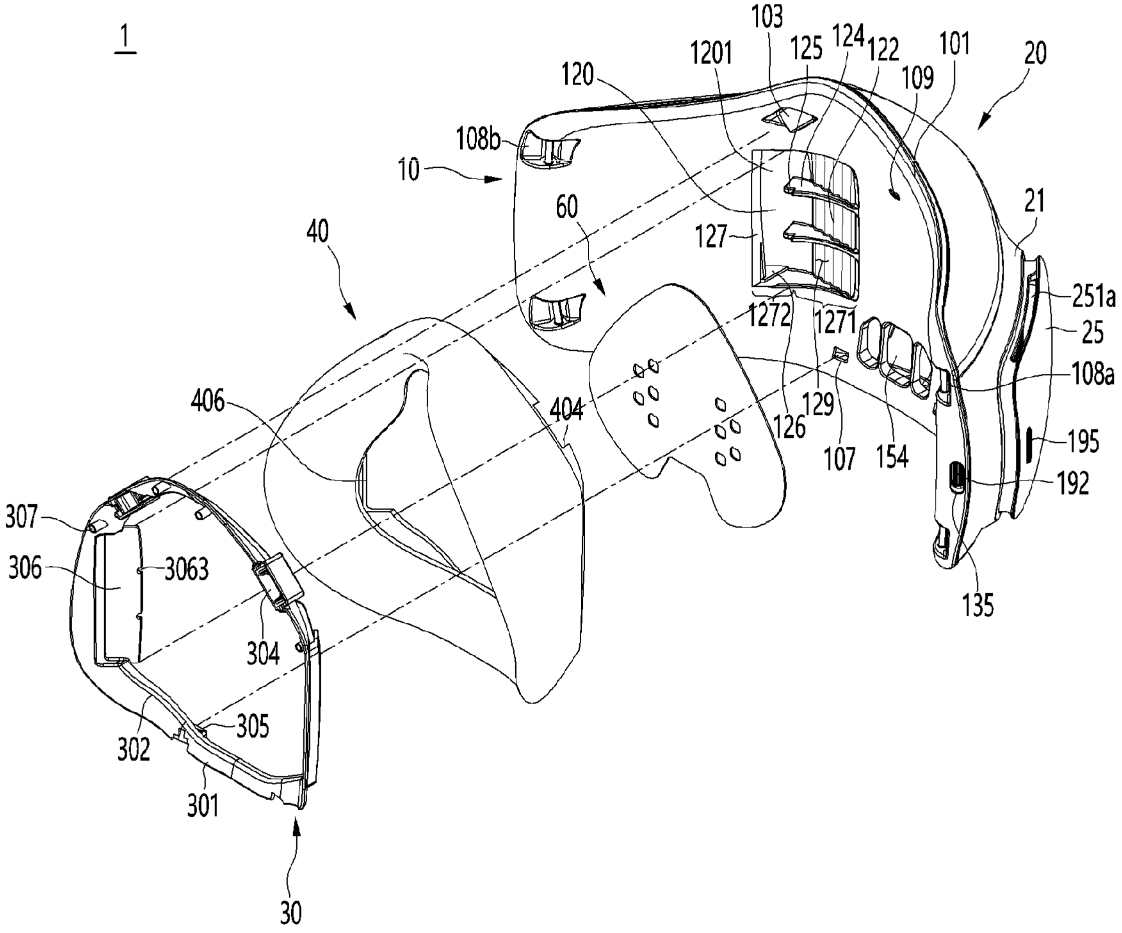
FIG. 9 is a rear exploded view showing the mask apparatus.

As illustrated in FIG. 9, the sealing insertion portion 307 can be provided in the form of a cylindrical boss or a sleeve protruding from the front surface of the first sealing support 301 toward the rear surface. However, the sealing insertion portion 307 can be a simple hole. The front surface of the first sealing support 301 can be understood as a surface in a direction toward the mask body 10, and the rear surface of the first sealing support 301 can be understood as a surface opposite to the front surface.

The sealing insertion portion 307 can be provided in plurality at the left and the right side based on the center of the sealing bracket 30. In some implementations, the sealing insertion portion 307 can be provided on each of edges of both sides of the first body coupling portion 304.

The seal 40 can be made of a material having elasticity. The seal 40 can be in close contact with the user's face and deformed to correspond to an outline of the user's face. The seal 40 can be provided in a ring shape forming a closed loop. The seal 40 can be provided to cover the user's nose and mouth.

Figure 11:
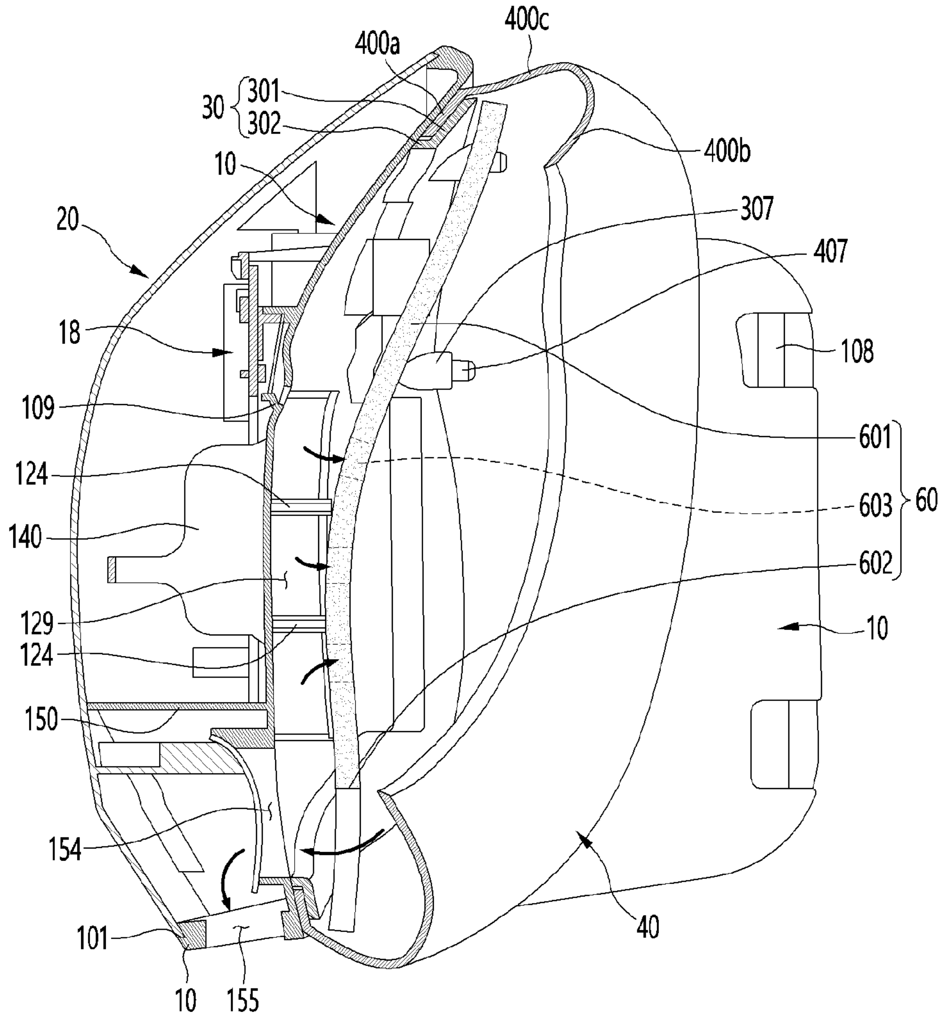
FIG. 11 is a cross-sectional view taken along line 11-11 of FIG. 8.

The seal 40 includes a coupling portion 400*a* coupled to the mask body 10, a side surface portion 400*c* extending from the coupling portion 400*a* toward the user's face, and a contact portion 400*b* that is bent from an end of the side surface portion 400*c* to extend toward the coupling portion 400*a* (see FIG. 11).

The contact portion 400*b* can be a portion that is in close contact with the user's face, and the side surface portion 400*c* and the contact portion 400*b* can be angled at an angle of about 90 degrees or less to define a space between the side surface portion 400*c* and the contact portion 400*b*.

A first opening can be defined inside the coupling portion 400*a*, and a second opening can be defined inside the contact portion 400*b*. As illustrated in FIG. 3, the second opening can include a main opening in which the front of the user's nose and mouth are disposed and a sub opening extending from an upper end of the main opening and disposed on the user's nose.

In some examples, a lower portion of the main opening, that is, a portion that is in close contact with the front of the user's jaw can be designed closer to the mask body 10 than a portion that is in close contact with the front of the user's cheek.

In some examples, a plurality of ventilation holes can be defined in the contact portion 400*b* to minimize a phenomenon in which moisture is generated on the user's cheek. The plurality of ventilation holes can have different sizes, and as an example, a diameter of the ventilation hole can gradually increase from an inner edge to an outer edge of the contact portion 400*b*.

The air outlet 129 and the air exhaust holes 154 and 155 can be provided inside the first opening, and the user's nose and mouth can be disposed inside the second opening.

The seal 40 is disposed between the user's face and the mask body 10, and the breathing space S is defined by the coupling portion 400*a*, the contact portion 400*b*, and the inner side of the side surface portion 400*c* of the seal 40.

The coupling portion 400*a* of the seal 40 can include a sealing packing portion 401.

The sealing packing portion 401 can be pressed by the first sealing support 301 and the second sealing support 302 of the sealing bracket 30 to contact the rear surface of the mask body 10. As a result, a gap can be reduced or eliminated between the sealing bracket 30 and the rear surface of the mask body 10 to thereby restrict the air flow between the breathing space S and the external space.

A sealing protrusion 407 can protrude from the coupling portion 400*a* of the sealing packing portion 401. In detail, the sealing protrusion 407 can protrude by a predetermined length from the rear surface of the coupling portion 400*a* toward the sealing bracket 30 and then be inserted into the sealing insertion portion 307. The sealing protrusion 407 can be provided in a cylindrical or tapered shape.

The sealing protrusion 407 can be provided at position and in number corresponding to the sealing insertion portion 307. Since the sealing protrusion 407 is inserted into the sealing insertion portion 307, the seal 40 and the sealing bracket 30 can be coupled to form one body.

The seal 40 includes a first seating portion 404 on which the first body coupling portion 304 is seated, a second seating portion 405 on which the second body coupling portion 305 is seated, and a third seating portion 406 on which the bracket insertion portion 306 is seated.

The first and third seating portions 404 and 406 can be understood as grooves in which a portion of the seal 40 is cut to form an accommodation space in which the first body coupling portion 304 and the bracket insertion portion 306 are accommodated. In some examples, the second seating portion 405 can be understood as a hole in which a portion of the seal 40 is cut to pass through the second body coupling portion 305.

In some examples, the first seating portion 404 can be defined as a first opening, the second seating portion 405 can be defined as a second opening, and the third seating portion 406 can be defined as a third opening.

The mask apparatus 1 can further include a pad 60, and the contents of the pad 60 will be described in more detail with reference to FIG. 11.

Figure 6:
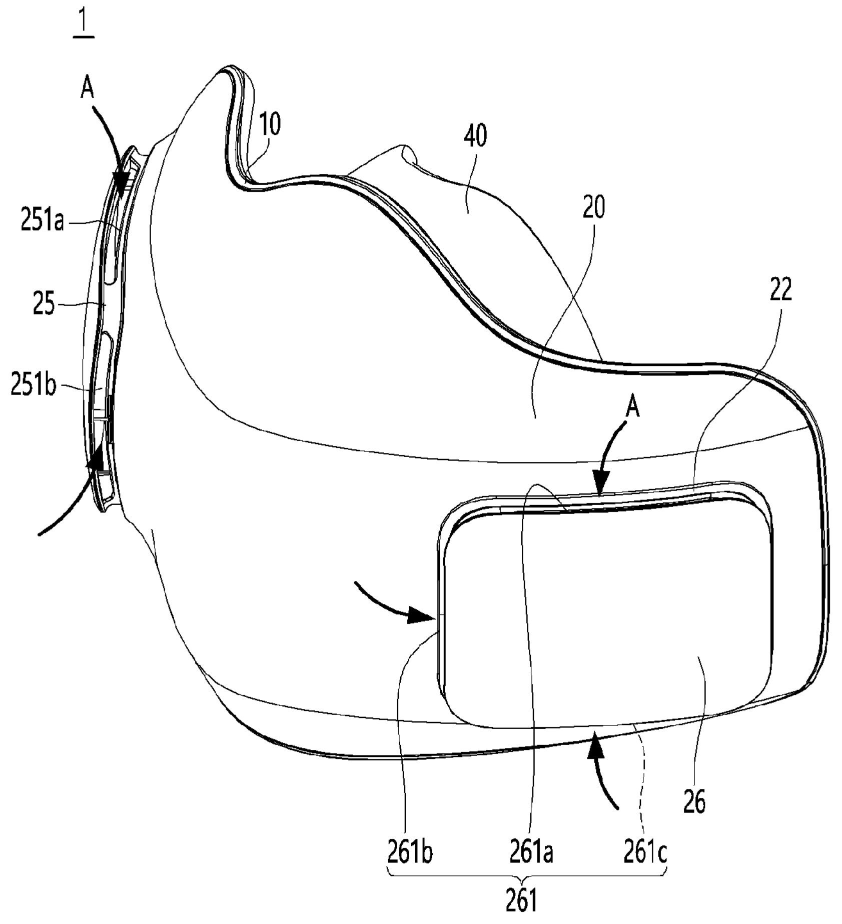
FIGS. 6 and 7 are views illustrating examples of a flow of air when the mask apparatus operates.
Figure 7:
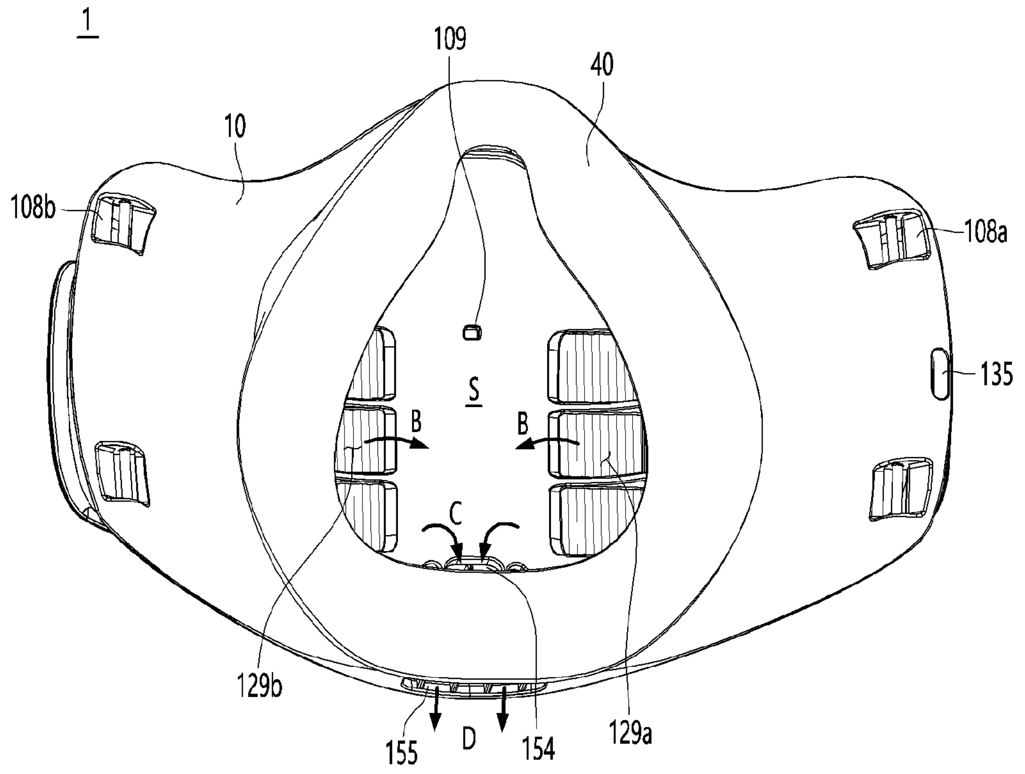

FIGS. 6 and 7 are views illustrating examples of a flow of air when the mask apparatus operates.

Referring to FIGS. 6 and 7, the mask apparatus 1 can suction the external air through the air inlets 251 and 261 provided in the filter covers 25 and 26. The flow direction of the external air suctioned into the mask apparatus 1 is indicated by a reference symbol A.

Since the air inlets 251 and 261 are provided in plurality to suction the air in various directions, an inflow rate of the external air increases.

For example, the air inlets 251 and 261 can include air inlets 251*a* and 261*a* for suctioning air flowing at upper sides of the filter covers 25 and 26, air inlets 251*b* and 261*b* for suctioning air flowing at a front side of the filter covers 25 and 26, and air inlets 251*c* and 261*c* for suctioning air flowing at a lower side of the filter covers 25 and 26. The side air inlets 251*b* and 261*b* can be provided at one or both sides of the left and right sides of the filter covers 25 and 26.

Since the filter covers 25 and 26 in which the air inlets 251 and 261 are provided are respectively disposed at left and right sides of the front surface of the mask apparatus 1, the external air can be smoothly suctioned from the left and right sides of the front surface of the mask apparatus 1.

The external air introduced through the air inlets 251 and 261 can be filtered by passing through the filters 23 and 24 disposed inside the filter mounting portions 21 and 22. The filters 23 and 24 can be replaced when the filter covers 25 and 26 are separated from the mask apparatus 1.

The air passing through the filters 23 and 24 can be introduced into the fan suction holes of the fan modules 16 and 17 through the air suction holes 211 and 221. Since the filter mounting portions 21 and 22 in which the air suction holes 211 and 221 are defined and the fan modules 16 and 17 are assembled in the state of being in close contact with each other, the air passing through the filter may not leak to the outside, and the external air may not be introduced between the filter mounting portions 21 and 22 and the fan modules 16 and 17.

The air discharged through the fan outlets of the fan modules 16 and 17 can pass through the air duct 120 to flow into the breathing space S through the air outlet 129. A flow direction of the air introduced into the breathing space S through the air outlet 129 is indicated by a reference symbol B.

The breathing space can be defined by the mask body 10 and the seal 40. When the mask body 10 is in close contact with the user's face, the seal 40 can be in close contact with the mask body 10 and the user's face to form an independent breathing space that is separated from the external space.

The user inhales after suctioning the filtered air supplied through the air outlet 129 can be exhausted to the external space through the air exhaust holes 154 and 155.

As described above, the air exhaust holes 154 and 155 include a first air exhaust hole 154 communicating with the breathing space and a second air exhaust hole 155 communicating with the external space, and the first air exhaust hole 154 and the second air exhaust hole 155 can communicate with each other by the flow space defined by the air discharge portion 150. The air exhaled by the user can be guided into the flow space through the first air exhaust hole 154. A flow direction of the air flowing into the flow space through the first air exhaust hole 154 is indicated by a reference symbol C.

The air guided into the flow space through the first air exhaust hole 154 can be discharged to the external space through the second air exhaust hole 155. A flow direction of the air discharged into the external space through the second air exhaust hole 155 is indicated by a reference symbol D.

Figure 8:
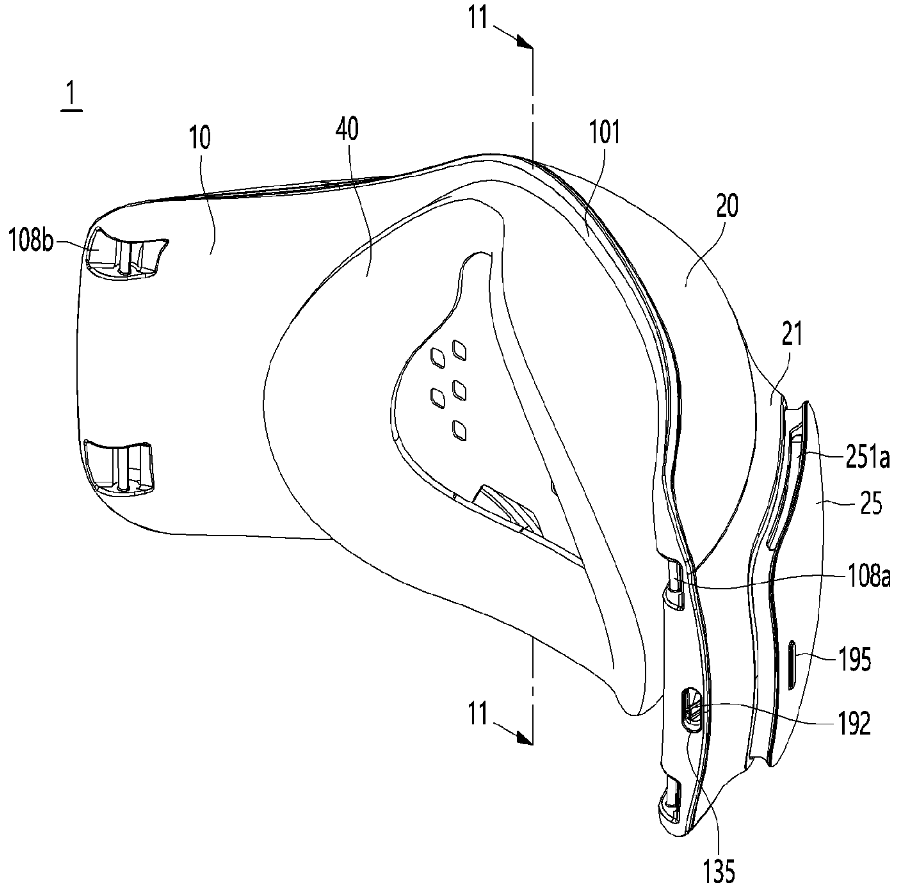
FIG. 8 is a rear perspective view showing the mask apparatus.
Figure 10:
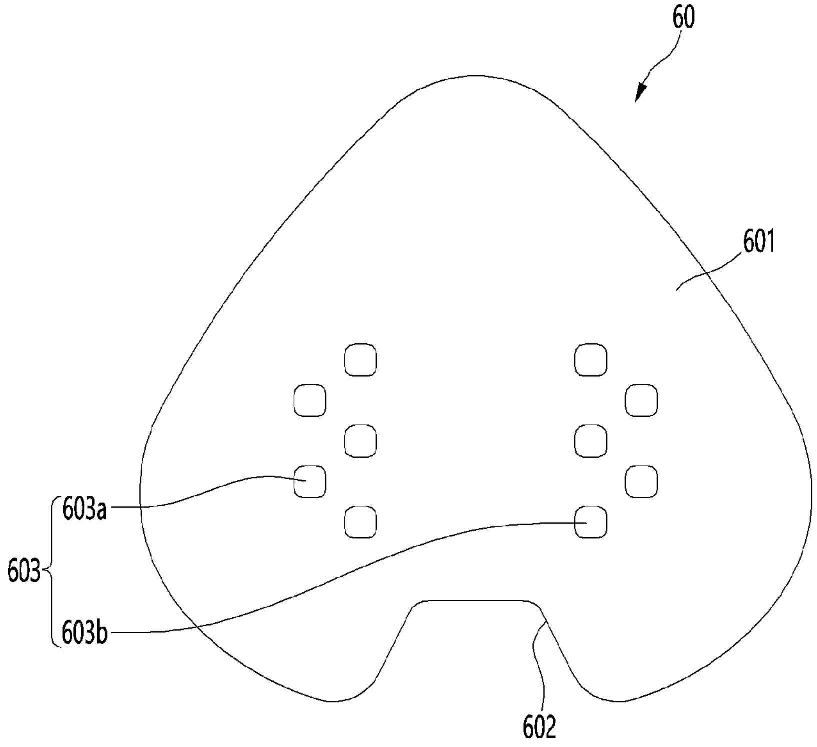
FIG. 10 is a front view showing an example of a pad of the mask apparatus.

FIG. 8 is a rear perspective view showing the mask apparatus, FIG. 9 is a rear exploded view showing the mask apparatus, and FIG. 10 is a front view showing an example of a pad, and FIG. 11 is a cross-sectional view taken along line 11-11 of FIG. 8.

Referring to FIGS. 8 to 11, the first bracket coupling portion 103 and the second bracket coupling portion 107 are disposed on upper and lower portions of the front surface of the mask body 10, respectively.

In some examples, the first magnetic member 15 is mounted on the first bracket coupling portion 103. In some examples, the second magnetic member 35 mounted on the first body coupling portion 304 of the sealing bracket 30 can be attached to the rear surface of the first bracket coupling portion 103 by the magnetic force generated in the first magnetic member 15, and thus, an upper portion of the sealing bracket 30 can be fixed to the upper portion of the mask body 10.

In some examples, when the second body coupling portion 305 is fitted into or hooked to be coupled to the second bracket coupling portion 107, the lower portion of the sealing bracket 30 can be fixed to the lower portion of the mask body 10.

The mask body 10 can include a cutoff portion 127. The cutoff portion 127 can be defined by cutting a portion of the mask body 10. The cutoff portion 127 can be understood as an opening defined by cutting a portion of the rear surface of the mask body 10 to connect the air duct 120 provided inside the mask body 10 to the breathing space. Although referred to as a cutoff portion in some implementations, it can be defined as an opening or a hole, and the cutoff portion can be understood as an outlet of the air duct 120.

The air duct 120 can be provided in the mask body 10. The air duct 120 can include a first air duct extending to a right side from the center of the mask body 10 and a second air duct extending to a left side.

A front surface of the air duct 120 can protrude further forward than the front surface of the mask body 10. A portion of the front surface of the mask body 10 can protrude forward to provide the air duct 120.

The cutoff portion 127 can include a first cutout portion functioning as an outlet of the first air duct 120*a* and a second cutout portion functioning as an outlet of the second air duct. In some examples, the first cutoff portion 127*a* can be disposed at the right side with respect to the center of the mask body 10, and the second cutoff portion 127*b* can be disposed at the left side.

In more detail, the first air duct 120*a* and the first cutoff portion are disposed between the center of the mask body 10 and the first fan module 16, and the second air duct and the second cutoff portion can be disposed between the mask body and the second fan module 17.

Due this structure, the air suctioned by the first fan module 16 and the second fan module 17 can flow along the air duct 120 in a direction from both ends of the mask body 10 toward the center of the mask body 10 and then be supplied to the user's nose or mouth.

The cutoff portion 127 can include a first space 1271 corresponding to the air outlet 129 and a second space 1272 into which the bracket insertion portion 306 of the sealing bracket 30 is shielded. The first space 1271 can define a discharge space through which the air flows. The second space 1272 can be defined as a mounting space into which the bracket insertion portion 306 is disposed.

Since the bracket insertion portion 306 is inserted into the second space, an effect of extending the air passage can be obtained in addition to the effect of stably supporting the central portion of the seal 40.

In detail, when the bracket insertion portion 306 is placed in the second space 1272, and the second space 1272 is shielded, an outlet of the air duct 120 can decrease, but the effect of extending the air passage can be obtained. Accordingly, most of the inhaled air is concentrated to the user's nose and mouth, and an amount of air distributed toward the user's cheeks can be minimized.

The front surface portion of the air duct 120 can include a curved portion 1201 and a flat portion 1202, as described above.

The curved portion 1201 constitutes a portion of the front surface portion and can guide the flow direction of the air supplied from the fan modules 16 and 17 to the breathing space.

The curved portion 1201 can be rounded at a predetermined curvature to extend from the fan outlet of the fan modules 16 and 17 toward the cutoff portion 127. The curved portion 1201 can guide the flow direction so that the air discharged from the fan outlets of the fan modules 16 and 17 flows toward the user's nose.

In some examples, the flat portion 1202 extends from the curved portion 1201 to one side end of the cutoff portion 127 of the mask body 10. An uneven portion 122 can be disposed on the rear end of the flat portion 1202.

The uneven portion 122 can be a plurality of protrusions or ribs that protrude from the rear surface of the flat portion 1202 to extend vertically and are spaced apart from each other in a width direction (lateral direction) of the mask body 10.

The air discharged from the fan modules 16 and 17 can pass through the air duct 120 and be introduced into the breathing space. In detail, the air discharged from the fan modules 16 and 17 can flow in a laminar flow manner between the curved portion 1201 and the bracket insertion portion 306.

The air passing between the curved portion 1201 and the bracket insertion portion 306 can flow in the laminar flow manner due to a flow velocity of air forcedly flowing by the fan modules 16 and 17. The air flowing in the laminar flow manner can be converted into a turbulent flow while passing through the uneven portion 122 of the flat portion. The air converted from the laminar flow to the turbulent flow by the uneven portion 122 can pass through the air outlet 129 and be discharged into the breathing space. When the air flow is converted from the laminar flow into the turbulent flow by the uneven portion 122, noise can be reduced while the flow rate of the air supplied to the breathing space S through the air outlet 129 increases.

The air duct 120 can include a division portion 124. The division portion 124 can protrude from a rear surface of the front surface portion to extend in a flow direction of the suctioned air. In some examples, a plurality of division portions 124 can be spaced apart from each other in the vertical direction of the front surface portion. As a result, the air passing through the air duct 120 can be divided into a plurality of passages by the plurality of division portions 124 and then be introduced into the breathing space.

The division portion 124 can include a bracket coupling groove 125. The bracket insertion portion 306 of the sealing bracket 30 can be disposed in the bracket coupling groove 125.

The bracket coupling groove 125 can be defined by recessing or stepping an end of the division portion 124. When the bracket insertion portion 306 is disposed in the bracket coupling groove 125, an edge of the bracket insertion portion 306 can be supported by the division portion 124. The cutoff portion 127 can be divided into a second space 1272 into which the bracket insertion portion 306 is inserted and a first space 1271 through which air is discharged by the bracket coupling groove 125.

The air duct 120 can include a bracket support 126. The bracket support 126 can be stepped on each of top and bottom surfaces of the air duct 120 to support upper front and lower front ends of the bracket insertion portion 306 and guide the insertion position of the bracket insertion portion 306 inserted into the second space 1272.

The bracket support 126 can protrude from each of the top and bottom surfaces of the air duct 120 in a direction approaching a horizontal surface passing through the center of the air duct when the mask apparatus is erected. In some examples, the bracket support 126 can be inclined from an edge of the top or bottom surface of the air duct 120 toward the center of the mask body 10.

Due to this structure, the bracket insertion portion 306 can be disposed in the second space 1272, and the division portion 124 and the uneven portion 122 can be disposed in the first space 1271.

On the other hand, looking at the structure of the sealing bracket 30 in more detail, the second sealing support 302 can be formed thicker than the first sealing support 301 disposed at the outside to perform a function a reinforcement rib that reinforces strength of the first sealing support 301.

The sealing bracket 30 constituted by the first sealing support 301 and the second sealing support 302 can have a T-shaped cross-sectional shape, and the second sealing support 302 can be understood as a fixed rib that fixes the insertion position of the seal 40.

In detail, the sealing packing portion 401 of the seal 40 can be disposed between the first sealing support 301 and the rear surface of the mask body 10. An inner edge of the sealing packing portion 401 can contact the second sealing support 302. Since the sealing packing portion 401 is inserted between the first sealing support 301, the second sealing support 302, and the rear surface of the mask body 10, a gap can be minimized or eliminated between the rear surface of the mask body 10 and the sealing bracket 30.

The second magnetic member 35 mounted on the first body coupling portion 304 of the sealing bracket 30 can have an "n" shape. For example, the second magnetic member 35 can include a magnetic body defining a main body thereof, and a pair of extension ends extending in a direction crossing the magnetic body at both ends of the magnetic body. In some examples, a fixing protrusion protrudes from an end of each of the pair of extension ends, and the fixing protrusions protrude in a direction closer to each other. Thus, when the second magnetic member 35 is coupled to the first body coupling portion 304, a stably hooked state of the second magnetic member 35 can be ensured by the fixing protrusions.

Specifically, the pair of extension ends are respectively inserted into a pair of holes or slits defined in the first body coupling portion 304, and the fixing protrusion is hooked with the hole or slit to the second magnetic member 35 from being separated from the hole of the first body coupling portion 304.

A portion of the first body coupling portion 304 disposed between the pair of holes or slits can be defined as an insertion guide. In some examples, the insertion guide can be rounded at a predetermined curvature and can guide the extension end to be smoothly inserted into the hole or slit, and serve to support the magnetic body.

A division portion insertion groove 3063 can be defined in an inner end of the bracket insertion portion 306. The division portion insertion groove 3063 is defined to avoid an interference with the division portion 124 when the bracket insertion portion 306 is seated on the cutoff portion 127.

Referring to FIG. 10, the mask apparatus 1 can further include a pad 60.

The pad 60 can include a pad body 601 defining a main body thereof.

The pad body 601 can be made of a fabric material, a paper material, a rubber material, a silicone material, or the like.

The pad body 601 can be provided in the form of a thin sheet. In some implementations, it is referred to as the pad, but it can also be referred to as a sheet or a thin film.

The pad body 601 can be detachably inserted into the inner space of the seal 40. The pad body 601 can be disposed between the coupling portion **400*a* and the contact portion 400*b* inside the seal 40. An edge of the pad body 601 can contact the side surface portion 400*c***.

In some implementations, the pad body 601 can be provided in a shape of which a lower portion is widened, and an upper portion is narrowed. This shape is for corresponding to a shape of which a size gradually decreases from a lower portion at which the user's mouth is disposed toward an upper portion of the seal 40 at which the user's nose is disposed.

A first air-passing portion 603 and a second air-passing portion 602 can be defined in the pad body 601. The first air-passing portion 603 can be disposed above the second air-passing portion 602. The first air-passing portion 603 can be provided at each of left and right sides with respect to the center of the pad 60. The first air-passing portion 603 can be constituted by a plurality of holes and can include a right air-passing portion **603*a* defined at the right side with respect to the center of the pad 60 and a left air-passing portion 603***b* at the left side. The first air-passing portion 603 can be defined at a position corresponding to the air outlet 129 so that the air supplied from the air outlet 129 is supplied to the user's nose and mouth.

The second air-passing portion 602 can be disposed at the center of the lower portion of the pad body 601. The second air-passing portion 602 can be provided in a hole shape by cutting the lower portion of the pad body 601 or can be provided by recessing the lower portion of the pad body 601 toward the upper portion.

As another example, the second air-passing portion 602 can be provided at each of both sides of the pad 60.

The second air-passing portion 602 can be disposed at a position corresponding to the air exhaust holes 154 and 155 so that the air exhaled by the user passes through the second air-passing portion 602 and the air exhaust holes 154 and 155 and then is discharged to the outside of the mask apparatus 1.

The pad 60 can divide the breathing space into a front space and a rear space. The front space can be understood as a space into which air is supplied from the air outlet 129, and the rear space can be understood as a space in which a user's face is disposed.

With the pad 60, it can be possible to maintain the mask apparatus 1 in a clean state for a long time by blocking saliva drops or the like splashing out of the user's mouth from the mask body 10.

In some implementations, since the first air-passing portion 603 is provided in the pad 60, there is an advantage that the user smoothly breathes even if the pad 60 is disposed in the breathing space.

Figure 12:
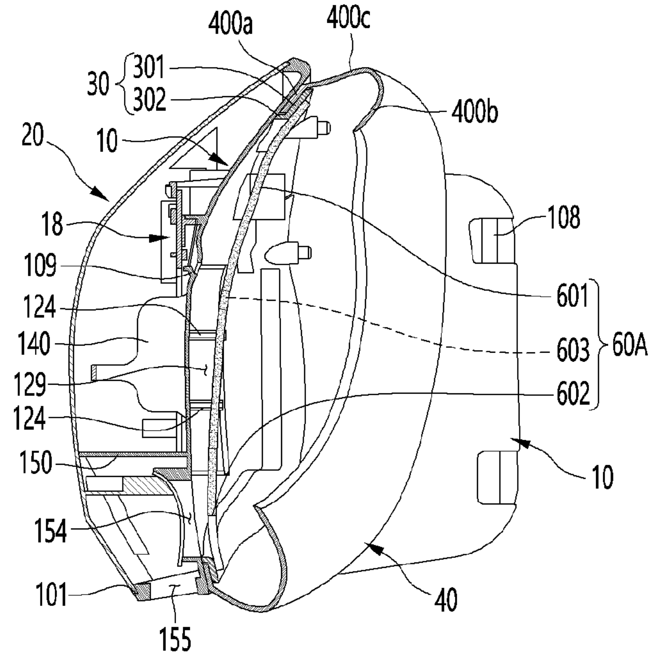
FIG. 12 is a longitudinal cross-sectional view showing an example of a mask apparatus including a pad mounting structure.
Figure 13:
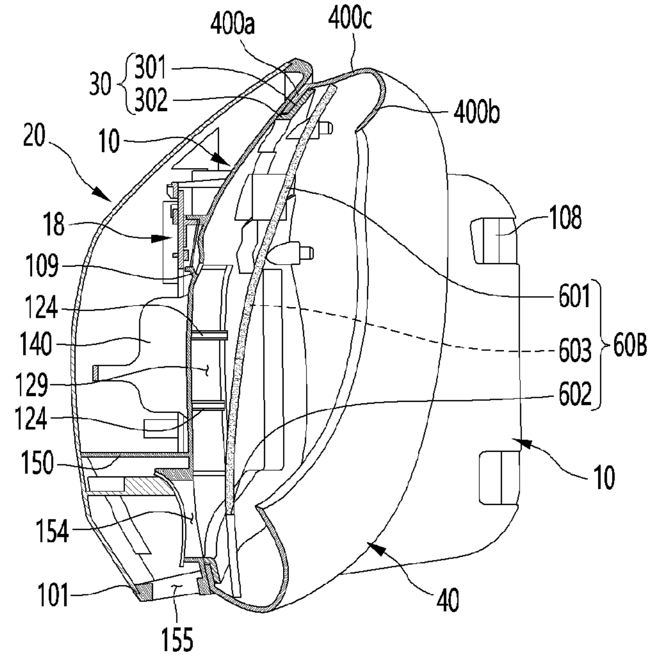
FIG. 13 is a longitudinal cross-sectional view showing an example of a pad mounting structure.

FIG. 12 is a longitudinal cross-sectional view showing an example of a mask apparatus including a pad mounting structure, and FIG. 13 is a longitudinal cross-sectional view showing an example of a pad mounting structure.

In some examples, referring to FIG. 12, a pad 60 can be coupled to a sealing bracket 30. In some examples, referring to FIG. 13, the pad 60 can be fixed to the seal 40.

For instance, the pad fixed to the sealing bracket 30 is defined as a bracket pad 60A, and the pad fixed to the seal 40 is defined as a sealing pad 60B.

The bracket pad 60A and the sealing pad 60B are also provided with a first air-passing portion 603 and a second air-passing portion 602 in the pad body 601, similar to the detachable pad 60 described in FIGS. 10 and 11. Thus, duplicated description with respect to the second air-passing portions will be omitted.

A pad body 601 of the bracket pad 60A can be fixed to be integrated with the sealing bracket 30. That is, the bracket pad 60A can be coupled to the sealing bracket 30 or provided in a shape that is integrated with the sealing bracket 30 by a manufacturing process such as injection molding.

Since the bracket pad 60A is fixed to the sealing bracket 30, when the sealing bracket 30 can be coupled to the mask body 10, the bracket pad 60A can also be coupled to the mask body 10.

In some examples, since the bracket pad 60A is provided integrally with the sealing bracket 30, there is an advantage in that maintenance of the bracket pad 60A is easy.

The bracket pad 60A can divide a breathing space into a front space and a rear space. The breathing space defined by the bracket pad 60A can have a space in which the front space is less than the rear space.

Since the bracket pad 60A is disposed adjacent to the rear surface of the mask body 10, the air discharged from the air outlet 129 can be quickly introduced into the first air-passing portion 603. In some examples, air exhaled by the user can be quickly guided to the first air exhaust hole 154 by passing through the second air-passing portion 602.

When a rear space is formed larger than a front space, the space for accommodating the user's nose and mouth is widened, and thus, the user's breathing can be smooth. In some examples, it can be possible to reduce or eliminate the gap between the bracket pad 60A and the sealing bracket 30.

Referring to FIG. 13, the pad body 601 of the sealing pad 60B can be fixed to the seal 40.

The sealing pad 60B can be fixed to the side surface portion 400*c* of the seal 40. An edge of the pad body 601 can extend in a direction toward the side surface portion 400*c* in the breathing space and be connected to an inner surface of the side surface portion 400*c*. That is, the sealing pad 60B can be provided as a portion of the seal 40.

Since the sealing pad 60B is integrated with the seal 40, the coupling of the seal 40 to the sealing bracket 30 can be instead of a process of mounting the sealing pad 60B.

In some examples, the sealing pad 60B can be coupled to the seal 40 to be integrated with the seal 40 or can be provided in a shape that is integrated with the seal 40 by an injection process.

In some examples, since the sealing pad 60B is provided to be integrated with the seal 40, there is an advantage that cleaning is facilitated after separating the seal 40 from the sealing bracket 30. For example, the sealing pad 60B can be made of the same material as the seal 40.

Here, the breathing space S can be divided into a front space and a rear space by the sealing pad 60B. In some examples, a size of each of the space and the rear space can be determined according to a position at which the edge of the sealing pad 60*b* is connected to the side surface portion 400*c*.

The mask apparatus can have following effects.

In some implementations, it can be possible to prevent or reduce introduction of the saliva or the water droplets into the mask.

In some implementations, the air can smoothly flow in the breathing space defined between the inner surface of the mask and the user's face.

In some implementations, the mask apparatus can be maintained in the clean state by minimizing the phenomenon in which the saliva or the water droplets are permeated into the inner surface of the mask or minimizing the formation of the water droplets inside the mask.

In some implementations, the mask apparatus can be easily maintained, repaired, and cleaned.

In some implementations, the air supplied from the outside of the mask apparatus can be quickly supplied to the user's respirator organ, and the air discharged from the respirator organ can be quickly discharged to the external space.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mask apparatus comprising:

a mask body comprising an air duct disposed at a front surface thereof, and a fan module mounting portion disposed at a suction-side of the air duct;

a fan module disposed at the fan module mounting portion and configured to supply external air to the air duct;

a mask body cover that is coupled to the front surface of the mask body and covers the fan module and the air duct;

a seal coupled to a rear surface of the mask body and configured to contact a user's face and define a breathing space for the user;

a sealing bracket that fixes a portion of the seal to the rear surface of the mask body; and a pad configured to be disposed inside the breathing space, wherein the pad defines an air-passing portion, wherein the air-passing portion comprises:

a first air-passing portion configured to supply the external air introduced into the breathing space through the air duct to the user, and a second air-passing portion configured to discharge air exhaled by the user to an outside of the breathing space, wherein the first air-passing portion comprises a plurality of opening holes that are defined above the second air-passing portion, and wherein the second air-passing portion comprises (i) a groove that is recessed toward the first air-passing portion from a lower end of the pad, or (ii) a hole that passes through a lower region of the pad.

2. The mask apparatus according to claim 1, wherein the first air-passing portion comprises:

a left air-passing portion defined at a left region of the pad with respect to a position of the seal; and a right air-passing portion defined at a right region of the pad with respect to the position of the seal.

3. The mask apparatus according to claim 1, wherein the seal comprises:

a coupling portion that is pressed by the sealing bracket and coupled to the mask body;

a side surface portion that extends from the coupling portion rearward relative to the rear surface of the mask body; and a contact portion that is curved or bent from an end of the side surface portion and extends toward the coupling portion, and wherein an edge of the pad is disposed in a space defined between the side surface portion and the contact portion.

4. The mask apparatus according to claim 3, wherein the pad is configured to be detached from the breathing space.

5. The mask apparatus according to claim 4, wherein the edge of the pad defines a size of the pad, and is configured to contact an inner surface of the side surface portion.

6. The mask apparatus according to claim 3, wherein the edge of the pad is configured to couple to an inner surface of the side surface portion, or the pad and the side surface portion are parts of one body.

7. The mask apparatus according to claim 3, wherein the pad is configured to couple to the sealing bracket, or the pad and the sealing bracket are parts of one body.

8. The mask apparatus according to claim 7, wherein the sealing bracket comprises:

a first sealing support configured to bring the coupling portion into contact with the rear surface of the mask body; and a second sealing support disposed at an inner edge of the first sealing support.

9. The mask apparatus according to claim 8, wherein the second sealing support extends in a direction crossing the first sealing support and supports an inner edge of the coupling portion.

10. The mask apparatus according to claim 9, wherein the pad is provided in one body with the first sealing support or the second sealing support.

11. The mask apparatus according to claim 1, wherein the mask body defines:

an air outlet configured to supply air blown by the fan module to the breathing space; and air exhaust holes configured to discharge air exhaled by the user to the outside of the breathing space, wherein the first air-passing portion is defined at a position corresponding to the air outlet, and wherein the second air-passing portion is defined at a position corresponding to each of the air exhaust holes.

12. The mask apparatus according to claim 1, wherein the mask body cover defines:

a filter mounting portion that is recessed from a front surface of the mask body cover; and an air suction hole that is defined inside the filter mounting portion.

13. The mask apparatus according to claim 12, wherein the filter mounting portion comprises:

a first filter mounting portion defined at a right side of the mask body cover with respect to a position of the seal; and a second filter mounting portion defined at a left side of the mask body cover with respect to the position of the seal.

14. The mask apparatus according to claim 13, further comprising:

a first filter and a second filter, each of the first filter and the second filter being configured to be accommodated in the first filter mounting portion or the second filter mounting portion;

a first filter cover coupled to the first filter mounting portion and configured to cover the first filter, the first filter cover defining one or more first air inlets at a side surface of the first filter cover; and a second filter cover coupled to the second filter mounting portion and configured to cover the second filter, the second filter cover defining one or more second air inlets at a side surface of the second filter cover.

15. The mask apparatus according to claim 13, wherein the first filter cover or the second filter cover defines a filter cover opening, and comprises a manipulation portion disposed at the filter cover opening.

16. The mask apparatus according to claim 1, wherein the mask body defines a cover coupling groove at an edge of the front surface of the mask body, the cover coupling groove receiving an edge of the mask body cover.

17. The mask apparatus according to claim 1, further comprising:

hook mounting portions disposed side ends of the mask body; and bands, each of the bands being connected to one of the hook mounting portions and configured to surround an occipital region of the user or an ear of the user.

18. A mask apparatus comprising:

a mask body comprising an air duct disposed at a front surface thereof, and a fan module mounting portion disposed at a suction-side of the air duct;

a fan module disposed at the fan module mounting portion and configured to supply external air to the air duct;

a mask body cover that is coupled to the front surface of the mask body and covers the fan module and the air duct;

a seal coupled to a rear surface of the mask body and configured to contact a user's face and define a breathing space for the user;

a sealing bracket that fixes a portion of the seal to the rear surface of the mask body; and a pad configured to be disposed inside the breathing space, wherein the mask body cover defines:

a filter mounting portion that is recessed from a front surface of the mask body cover; and an air suction hole that is defined inside the filter mounting portion.

19. The mask apparatus according to claim 18, wherein the filter mounting portion comprises:

a first filter mounting portion defined at a right side of the mask body cover with respect to a position of the seal; and a second filter mounting portion defined at a left side of the mask body cover with respect to the position of the seal.

20. A mask apparatus comprising:

a mask body comprising an air duct disposed at a front surface thereof, and a fan module mounting portion disposed at a suction-side of the air duct;

a fan module disposed at the fan module mounting portion and configured to supply external air to the air duct;

a mask body cover that is coupled to the front surface of the mask body and covers the fan module and the air duct;

a seal coupled to a rear surface of the mask body and configured to contact a user's face and define a breathing space for the user;

a sealing bracket that fixes a portion of the seal to the rear surface of the mask body; and a pad configured to be disposed inside the breathing space and provided in a form of a thin sheet, wherein the fan module mounting portion is disposed at the front surface of the mask body, wherein the fan module mounting portion comprises a first fan module mounting portion and a second fan module mounting portion that are symmetric with respect to a vertical plane passing through a center of the front surface of the mask body, wherein the fan module comprises:

a first fan module mounted at the first fan module mounting portion, and a second fan module mounted at the second fan module mounting portion, wherein the air duct comprises:

a first air duct having an inlet connected to an edge of the first fan module mounting portion, the first air duct being disposed between the first fan module mounting portion and the vertical plane, and a second air duct having an inlet connected to an edge of the second fan module mounting portion, the second air duct being disposed between the second fan module mounting portion and the vertical plane, wherein the mask body comprises:

air outlets configured to supply filtered air to the breathing space, and air exhaust holes configured to discharge air exhaled by the user to an external space, and wherein the air outlets comprise:

a first air outlet connected to an outlet of the first air duct, and a second air outlet connected to an outlet of the second air duct.

* * * * *